US012683711B2

(12) United States Patent  (10) Patent No.: US 12,683,711 B2
Pulikkoonattu  (45) Date of Patent: Jul. 14, 2026

(54) SYSTEMS AND METHODS FOR PROBABILISTIC QUADRATURE AMPLITUDE MODULATION (QAM)

(71) Applicant: Avago Technologies International Sales Pte. Limited, Singapore (SG)

(72) Inventor: Rethnakaran Pulikkoonattu, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/782,806

(22) Filed: Jul. 24, 2024

(65) Prior Publication Data

US 2025/0266930 A1     Aug. 21, 2025

Related U.S. Application Data

(60) Provisional application No. 63/554,589, filed on Feb. 16, 2024.

(51) Int. Cl.
H04L 1/00 (2006.01)
H04L 27/36 (2006.01)

(52) U.S. Cl.
CPC .......... H04L 1/0058 (2013.01); H04L 27/366 (2013.01); H04L 1/0042 (2013.01)

(58) Field of Classification Search
CPC ... H04L 1/0058; H04L 27/366; H04L 1/0042; H04L 1/0057; H04L 1/0068; H04L 1/0071; H04L 1/06
See application file for complete search history.

(56) References Cited

U.S. PATENT DOCUMENTS

| | | | |
|---|---|---|---|
| 10,659,193 B2 * | 5/2020 | Lomayev | .......... H03M 13/6362 |
| 2020/0382139 A1 | 12/2020 | Yoffe et al. | |
| 2021/0091886 A1 * | 3/2021 | Yoffe | ...................... H04L 27/04 |
| 2021/0297182 A1 * | 9/2021 | Strobel | ................. H04L 1/0061 |

OTHER PUBLICATIONS

Arranz et al. "Design of a simulation platform to test next generation of terrestrial DVB", Internet Citation, dated Jul. 19, 2025.
Extended European Search Report on Appln. No. 25157331.7, dated Jul. 1, 2025.

* cited by examiner

*Primary Examiner* — Thien Nguyen
(74) *Attorney, Agent, or Firm* — Foley & Lardner LLP

(57) ABSTRACT

An apparatus may include a transmitter and one or more processors configured to identify a code rate of a low-density parity-check (LDPC) code, receive, by an LDPC encoder, a set of information bits and encode, using the code rate, the set of information bits to generate a set of encoded bits and a set of parity bits, generate, from the set of encoded bits, a matrix of bit arrays, discard one or more parity bits from the set of parity bits to generate a parity bit array with a size equal to a number of column of the matrix, generate a bit array by concatenating (1) one or more bit arrays selected from the matrix of bit arrays and (2) one or more bits selected from the parity bit array corresponding to the one or more bit arrays, and modulate, by a modulator, the bit array to generate modulated data.

20 Claims, 30 Drawing Sheets

1100

Identifying, by one or more processors, a code rate of a low-density parity-check (LDPC) code 1102

↓

Receiving, by an LDPC encoder of the first device, a set of information bits 1104

↓

Encoding, by the LDPC encoder using the code rate, the set of information bits to generate a set of encoded bits and a set of parity bits 1106

↓

Generating, from the set of encoded bits, a matrix of bit arrays 1108

↓

Discarding, by the one or more processors, one or more parity bits from the set of parity bits to generate a parity bit array with a size equal to a number of column of the matrix 1110

↓

Generating, by the one or more processors, a bit array by concatenating (1) one or more bit arrays selected from the matrix of bit arrays and (2) one or more bits selected from the parity bit array corresponding to the one or more bit arrays 1112

↓

Modulating, by a modulator, the bit array to generate modulated data for transmission by the transmitter 1114

100
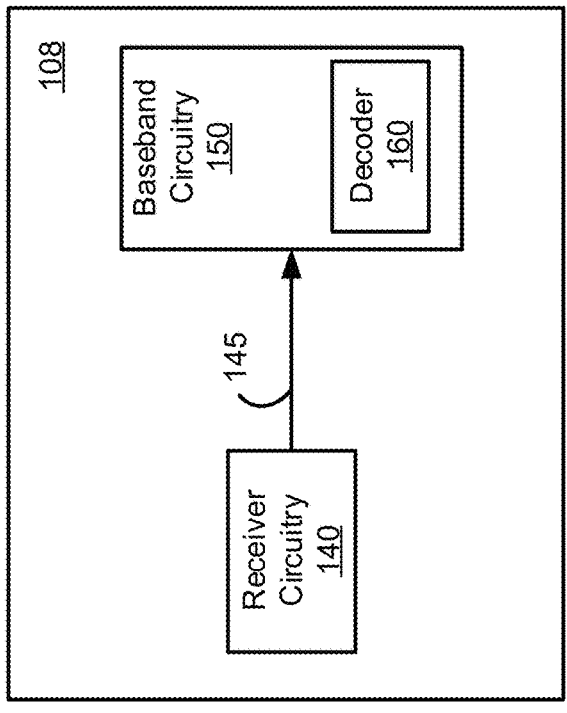
125
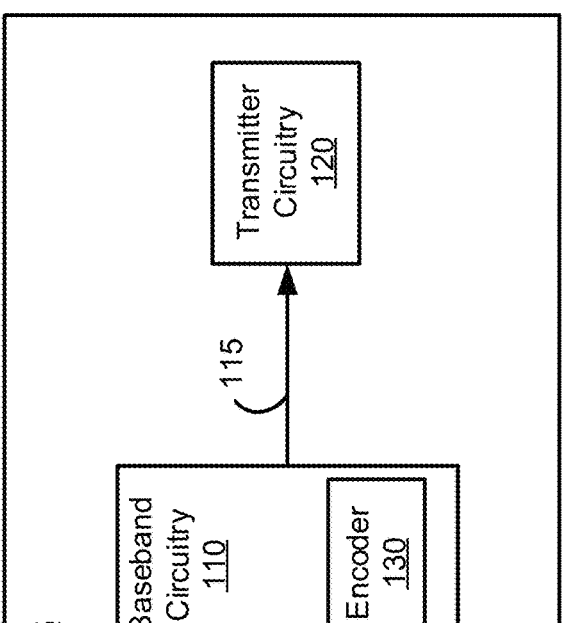
FIG. 1

350

450

400

550

551

500

700

| Idx 701 | Shaper-IN 702 | Shaper-OUT 703 | Amp 704 | Ps 705 | Dec 706 | P(X) 707 | Rate (Rs) 708 | Length 709 |
|---|---|---|---|---|---|---|---|---|
| 1 | [0, 0, 0, 0] | [1, 0, 0, 0, 0] | 1 | 1/16 | 16 | 0.0625 | 0.951823 | 4 |
| 2 | [0, 0, 0, 1] | [1, 0, 0, 0, 1] | 3 | 1/16 | 17 | 0.0625 | 0.951823 | 4 |
| 3 | [0, 0, 1, 0] | [1, 0, 0, 1, 1] | 5 | 1/16 | 19 | 0.0625 | 0.951823 | 4 |
| 4 | [0, 0, 1, 1] | [1, 0, 0, 1, 0] | 7 | 1/16 | 18 | 0.0625 | 0.951823 | 4 |
| 5 | [0, 1, 0, 0] | [1, 0, 1, 1, 0] | 9 | 1/16 | 22 | 0.0625 | 0.951823 | 4 |
| 6 | [0, 1, 0, 1] | [1, 0, 1, 1, 1] | 11 | 1/16 | 23 | 0.0625 | 0.951823 | 4 |
| 7 | [0, 1, 1, 0] | [1, 0, 1, 0, 1] | 13 | 1/16 | 21 | 0.0625 | 0.951823 | 4 |
| 8 | [0, 1, 1, 1] | [1, 0, 1, 0, 0] | 15 | 1/16 | 20 | 0.0625 | 0.951823 | 4 |
| 9 | [1, 0, 0, 0, 0] | [1, 1, 1, 0, 0] | 17 | 1/32 | 28 | 0.03125 | 0.951823 | 5 |
| 10 | [1, 0, 0, 0, 1] | [1, 1, 1, 0, 1] | 19 | 1/32 | 29 | 0.03125 | 0.951823 | 5 |
| 11 | [1, 0, 0, 1, 0] | [1, 1, 1, 1, 1] | 21 | 1/32 | 31 | 0.03125 | 0.951823 | 5 |
| 12 | [1, 0, 0, 1, 1] | [1, 1, 1, 1, 0] | 23 | 1/32 | 30 | 0.03125 | 0.951823 | 5 |
| 13 | [1, 0, 1, 0, 0] | [1, 1, 0, 1, 0] | 25 | 1/32 | 26 | 0.03125 | 0.951823 | 5 |
| 14 | [1, 0, 1, 0, 1] | [1, 1, 0, 1, 1] | 27 | 1/32 | 27 | 0.03125 | 0.951823 | 5 |
| 15 | [1, 0, 1, 1, 0] | [1, 1, 0, 0, 1] | 29 | 1/32 | 25 | 0.03125 | 0.951823 | 5 |
| 16 | [1, 0, 1, 1, 1] | [1, 1, 0, 0, 0] | 31 | 1/32 | 24 | 0.03125 | 0.951823 | 5 |
| 17 | [1, 1, 0, 0, 0] | [0, 1, 0, 0, 0] | 33 | 1/32 | 8 | 0.03125 | 0.951823 | 5 |
| 18 | [1, 1, 0, 0, 1] | [0, 1, 0, 0, 1] | 35 | 1/32 | 9 | 0.03125 | 0.951823 | 5 |
| 19 | [1, 1, 0, 1, 0] | [0, 1, 0, 1, 1] | 37 | 1/64 | 11 | 0.015625 | 0.951823 | 6 |
| 20 | [1, 1, 0, 1, 1] | [0, 1, 0, 1, 0] | 39 | 1/64 | 10 | 0.015625 | 0.951823 | 6 |
| 21 | [1, 1, 1, 0, 0] | [0, 1, 1, 1, 0] | 41 | 1/64 | 14 | 0.015625 | 0.951823 | 6 |
| 22 | [1, 1, 1, 0, 1, 1] | [0, 1, 1, 1, 1] | 43 | 1/64 | 15 | 0.015625 | 0.951823 | 6 |
| 23 | [1, 1, 1, 1, 0, 0, 0] | [0, 1, 1, 0, 1] | 45 | 1/64 | 13 | 0.015625 | 0.951823 | 6 |
| 24 | [1, 1, 1, 1, 0, 0, 1] | [0, 1, 1, 0, 0] | 47 | 1/64 | 12 | 0.015625 | 0.951823 | 6 |
| 25 | [1, 1, 1, 1, 0, 1, 0] | [0, 0, 1, 0, 0] | 49 | 1/64 | 4 | 0.015625 | 0.951823 | 6 |
| 26 | [1, 1, 1, 1, 0, 1, 1] | [0, 0, 1, 0, 1] | 51 | 1/64 | 5 | 0.015625 | 0.951823 | 6 |
| 27 | [1, 1, 1, 1, 1, 0, 0] | [0, 0, 1, 1, 1] | 53 | 1/64 | 7 | 0.015625 | 0.951823 | 6 |
| 28 | [1, 1, 1, 1, 1, 0, 1] | [0, 0, 1, 1, 0] | 55 | 1/64 | 6 | 0.015625 | 0.951823 | 6 |
| 29 | [1, 1, 1, 1, 1, 1, 0] | [0, 0, 0, 1, 0] | 57 | 1/64 | 2 | 0.015625 | 0.951823 | 6 |
| 30 | [1, 1, 1, 1, 1, 1, 1, 0] | [0, 0, 0, 1, 1] | 59 | 1/128 | 3 | 0.0078125 | 0.951823 | 7 |
| 31 | [1, 1, 1, 1, 1, 1, 1, 0] | [0, 0, 0, 0, 1] | 61 | 1/256 | 1 | 0.00390625 | 0.951823 | 8 |
| 32 | [1, 1, 1, 1, 1, 1, 1, 1] | [0, 0, 0, 0, 0] | 63 | 1/256 | 0 | 0.00390625 | 0.951823 | 8 |

| Idx 801 | Shaper In 802 | Shaper Out 803 | Length 804 | Probability 805 |
|---|---|---|---|---|
| 1 | [0, 0, 0, 0] | [0, 1, 1, 1] | 4 | 0.0625 |
| 2 | [0, 0, 0, 1] | [0, 1, 1, 0] | 4 | 0.0625 |
| 3 | [0, 0, 1, 0] | [0, 1, 0, 1] | 4 | 0.0625 |
| 4 | [0, 0, 1, 1] | [0, 1, 0, 0] | 4 | 0.0625 |
| 5 | [0, 1, 0, 0] | [0, 0, 1, 1] | 4 | 0.0625 |
| 6 | [0, 1, 0, 1] | [0, 0, 1, 0] | 4 | 0.0625 |
| 7 | [0, 1, 1, 0] | [0, 0, 0, 1] | 4 | 0.0625 |
| 8 | [0, 1, 1, 1] | [0, 0, 0, 0] | 4 | 0.0625 |
| 9 | [1, 0, 0, 0, 0] | [0, 0, 0, 1, 1] | 5 | 0.03125 |
| 10 | [1, 0, 0, 0, 1] | [0, 0, 0, 1, 0] | 5 | 0.03125 |
| 11 | [1, 0, 0, 1, 0] | [0, 0, 0, 1, 1] | 5 | 0.03125 |
| 12 | [1, 0, 0, 1, 1] | [0, 0, 0, 0, 1] | 5 | 0.03125 |
| 13 | [1, 0, 1, 0, 0] | [0, 0, 1, 0, 1] | 5 | 0.03125 |
| 14 | [1, 0, 1, 0, 1] | [0, 0, 1, 0, 0] | 5 | 0.03125 |
| 15 | [1, 0, 1, 1, 0] | [0, 0, 1, 1, 1] | 5 | 0.03125 |
| 16 | [1, 0, 1, 1, 1] | [0, 0, 1, 1, 0] | 5 | 0.03125 |
| 17 | [1, 1, 0, 0, 0] | [1, 0, 1, 0, 0] | 5 | 0.03125 |
| 18 | [1, 1, 0, 0, 1] | [1, 0, 1, 0, 1] | 6 | 0.015625 |
| 19 | [1, 1, 0, 1, 0, 0] | [1, 0, 0, 0, 0] | 6 | 0.015625 |
| 20 | [1, 1, 0, 1, 0, 1] | [1, 0, 0, 0, 1] | 6 | 0.015625 |
| 21 | [1, 1, 0, 1, 1, 0] | [1, 0, 0, 1, 0] | 6 | 0.015625 |
| 22 | [1, 1, 0, 1, 1, 1] | [1, 0, 0, 1, 1] | 6 | 0.015625 |
| 23 | [1, 1, 1, 0, 0, 0] | [1, 0, 0, 0, 0] | 6 | 0.015625 |
| 24 | [1, 1, 1, 0, 0, 1] | [1, 1, 0, 1, 0] | 6 | 0.015625 |
| 25 | [1, 1, 1, 0, 1, 0] | [1, 1, 1, 0, 1] | 6 | 0.015625 |
| 26 | [1, 1, 1, 0, 1, 1] | [1, 1, 1, 0, 0] | 6 | 0.015625 |
| 27 | [1, 1, 1, 1, 0, 0] | [1, 1, 1, 0, 1] | 6 | 0.015625 |
| 28 | [1, 1, 1, 1, 0, 1] | [1, 1, 0, 0, 0] | 6 | 0.015625 |
| 29 | [1, 1, 1, 1, 1, 0] | [1, 1, 0, 0, 1] | 6 | 0.015625 |
| 30 | [1, 1, 1, 1, 1, 1, 0] | [1, 1, 1, 0, 0, 0] | 7 | 0.0078125 |
| 31 | [1, 1, 1, 1, 1, 1, 1, 0] | [1, 1, 1, 1, 1, 0] | 8 | 0.00390625 |
| 32 | [1, 1, 1, 1, 1, 1, 1, 1] | [1, 1, 1, 1, 1, 1] | 8 | 0.00390625 |

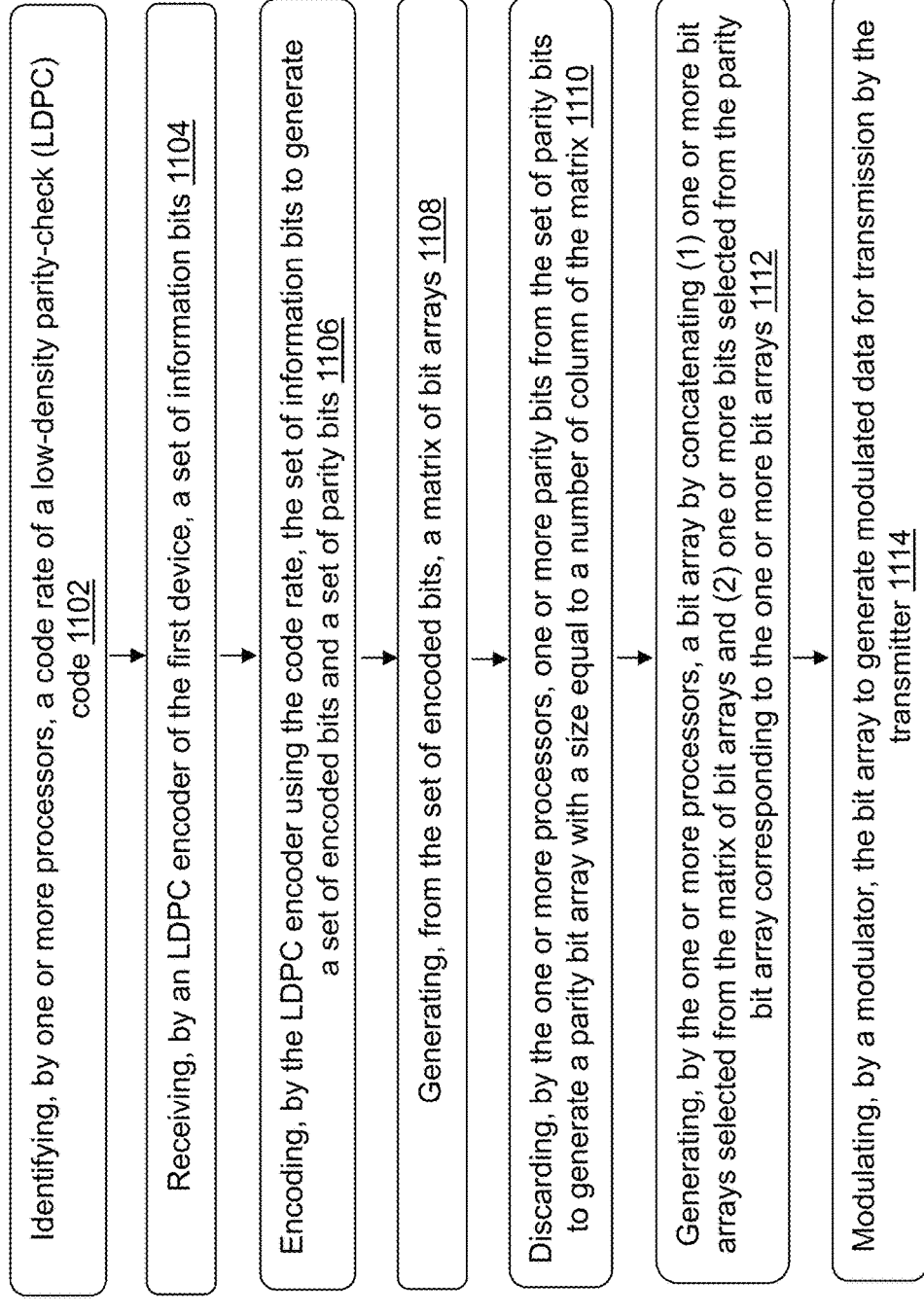

Identifying, by one or more processors, a code rate of a low-density parity-check (LDPC) code 1102

Receiving, by an LDPC encoder of the first device, a set of information bits 1104

Encoding, by the LDPC encoder using the code rate, the set of information bits to generate a set of encoded bits and a set of parity bits 1106

Generating, from the set of encoded bits, a matrix of bit arrays 1108

Discarding, by the one or more processors, one or more parity bits from the set of parity bits to generate a parity bit array with a size equal to a number of column of the matrix 1110

Generating, by the one or more processors, a bit array by concatenating (1) one or more bit arrays selected from the matrix of bit arrays and (2) one or more bits selected from the parity bit array corresponding to the one or more bit arrays 1112

Modulating, by a modulator, the bit array to generate modulated data for transmission by the transmitter 1114

| Row No. 1201 | Shaper-IN 1202 | Shaper-OUT 1203 | Length 1204 | P(X) 1205 | Dec 1206 | Idx 1207 | | Ps 1208 | Amp 1209 | Rate (Rs) 1210 |
|---|---|---|---|---|---|---|---|---|---|---|
| 1 | [0, 0, 0] | [1, 0, 0, 0, 0] | 3 | 0.125 | 16 | 0 | 1/8 | 1 | 0.834635 | |
| 2 | [0, 0, 1] | [1, 0, 0, 0, 1] | 3 | 0.125 | 17 | 1 | 1/8 | 3 | 0.834635 | |
| 3 | [0, 1, 0] | [1, 0, 0, 1, 1] | 3 | 0.125 | 19 | 2 | 1/8 | 5 | 0.834635 | |
| 4 | [0, 1, 1] | [1, 0, 0, 1, 0] | 3 | 0.125 | 18 | 3 | 1/8 | 7 | 0.834635 | |
| 5 | [1, 0, 0, 0] | [1, 0, 1, 1, 0] | 4 | 0.0625 | 22 | 4 | 1/16 | 9 | 0.834635 | |
| 6 | [1, 0, 0, 1] | [1, 0, 1, 1, 1] | 4 | 0.0625 | 23 | 5 | 1/16 | 11 | 0.834635 | |
| 7 | [1, 0, 1, 0] | [1, 0, 1, 0, 1] | 4 | 0.0625 | 21 | 6 | 1/16 | 13 | 0.834635 | |
| 8 | [1, 0, 1, 1] | [1, 0, 1, 0, 0] | 4 | 0.0625 | 20 | 7 | 1/16 | 15 | 0.834635 | |
| 9 | [1, 1, 0, 0, 0] | [1, 1, 1, 0, 0] | 5 | 0.03125 | 28 | 8 | 1/32 | 17 | 0.834635 | |
| 10 | [1, 1, 0, 0, 1] | [1, 1, 1, 0, 1] | 5 | 0.03125 | 29 | 9 | 1/32 | 19 | 0.834635 | |
| 11 | [1, 1, 0, 1, 0] | [1, 1, 1, 1, 1] | 5 | 0.03125 | 31 | 10 | 1/32 | 21 | 0.834635 | |
| 12 | [1, 1, 0, 1, 1] | [1, 1, 1, 1, 0] | 5 | 0.03125 | 30 | 11 | 1/32 | 23 | 0.834635 | |
| 13 | [1, 1, 1, 0, 0, 0] | [1, 1, 0, 1, 0] | 6 | 0.015625 | 26 | 12 | 1/64 | 25 | 0.834635 | |
| 14 | [1, 1, 1, 0, 0, 1] | [1, 1, 0, 1, 1] | 6 | 0.015625 | 27 | 13 | 1/64 | 27 | 0.834635 | |
| 15 | [1, 1, 1, 0, 1, 0, 0] | [1, 1, 0, 0, 1] | 7 | 0.0078125 | 25 | 14 | 1/128 | 29 | 0.834635 | |
| 16 | [1, 1, 1, 0, 1, 0, 1] | [1, 1, 0, 0, 0] | 7 | 0.0078125 | 24 | 15 | 1/128 | 31 | 0.834635 | |
| 17 | [1, 1, 1, 0, 1, 1, 0] | [0, 1, 0, 0, 0] | 7 | 0.0078125 | 8 | 16 | 1/128 | 33 | 0.834635 | |
| 18 | [1, 1, 1, 0, 1, 1, 1] | [0, 1, 0, 0, 1] | 7 | 0.0078125 | 9 | 17 | 1/128 | 35 | 0.834635 | |
| 19 | [1, 1, 1, 1, 0, 0, 0] | [0, 1, 0, 1, 1] | 7 | 0.0078125 | 11 | 18 | 1/128 | 37 | 0.834635 | |
| 20 | [1, 1, 1, 1, 0, 0, 1] | [0, 1, 0, 1, 0] | 7 | 0.0078125 | 10 | 19 | 1/128 | 39 | 0.834635 | |
| 21 | [1, 1, 1, 1, 0, 1, 0] | [0, 1, 1, 1, 0] | 7 | 0.0078125 | 14 | 20 | 1/128 | 41 | 0.834635 | |
| 22 | [1, 1, 1, 1, 0, 1, 1] | [0, 1, 1, 1, 1] | 7 | 0.0078125 | 15 | 21 | 1/128 | 43 | 0.834635 | |
| 23 | [1, 1, 1, 1, 1, 0, 0, 0] | [0, 1, 1, 0, 1] | 8 | 0.00390625 | 13 | 22 | 1/256 | 45 | 0.834635 | |
| 24 | [1, 1, 1, 1, 1, 0, 0, 1] | [0, 1, 1, 0, 0] | 8 | 0.00390625 | 12 | 23 | 1/256 | 47 | 0.834635 | |
| 25 | [1, 1, 1, 1, 1, 0, 1, 0] | [0, 0, 1, 0, 0] | 8 | 0.00390625 | 4 | 24 | 1/256 | 49 | 0.834635 | |
| 26 | [1, 1, 1, 1, 1, 0, 1, 1] | [0, 0, 1, 0, 1] | 8 | 0.00390625 | 5 | 25 | 1/256 | 51 | 0.834635 | |
| 27 | [1, 1, 1, 1, 1, 1, 0, 0] | [0, 0, 1, 1, 1] | 8 | 0.00390625 | 7 | 26 | 1/256 | 53 | 0.834635 | |
| 28 | [1, 1, 1, 1, 1, 1, 0, 1, 0] | [0, 0, 1, 1, 0] | 9 | 0.00195312 | 6 | 27 | 1/512 | 55 | 0.834635 | |
| 29 | [1, 1, 1, 1, 1, 1, 1, 0, 0] | [0, 0, 0, 1, 0] | 9 | 0.00195312 | 2 | 28 | 1/512 | 57 | 0.834635 | |
| 30 | [1, 1, 1, 1, 1, 1, 1, 0, 1] | [0, 0, 0, 1, 1] | 9 | 0.00195312 | 3 | 29 | 1/512 | 59 | 0.834635 | |
| 31 | [1, 1, 1, 1, 1, 1, 1, 1, 0] | [0, 0, 0, 0, 1] | 9 | 0.00195312 | 1 | 30 | 1/512 | 61 | 0.834635 | |
| 32 | [1, 1, 1, 1, 1, 1, 1, 1, 1] | [0, 0, 0, 0, 0] | 9 | 0.00195312 | 0 | 31 | 1/512 | 63 | 0.834635 | |

FIG. 12A

| Row No. 1301 | Shaper-IN 1302 | Shaper-OUT 1303 | Length 1304 | P(X) 1305 | Dec 1306 | Idx 1307 | Ps 1308 | Amp 1309 | Rate (Rs) 1310 |
|---|---|---|---|---|---|---|---|---|---|
| 1 | [0, 0, 0] | [0, 0, 0, 0, 0] | 3 | 0.125 | 16 | 0 | 1/8 | 1 | 0.890625 |
| 2 | [1, 1, 1] | [1, 0, 0, 0, 1] | 3 | 0.125 | 17 | 1 | 1/8 | 3 | 0.890625 |
| 3 | [1, 0, 0, 0] | [1, 0, 0, 0, 1] | 4 | 0.0625 | 19 | 2 | 1/16 | 5 | 0.890625 |
| 4 | [1, 0, 0, 1] | [1, 0, 0, 1, 0] | 4 | 0.0625 | 18 | 3 | 1/16 | 7 | 0.890625 |
| 5 | [1, 0, 1, 0] | [1, 0, 0, 1, 1] | 4 | 0.0625 | 22 | 4 | 1/16 | 9 | 0.890625 |
| 6 | [1, 0, 1, 1] | [1, 0, 1, 1, 1] | 4 | 0.0625 | 23 | 5 | 1/16 | 11 | 0.890625 |
| 7 | [1, 1, 0, 0] | [1, 0, 1, 0, 1] | 4 | 0.0625 | 21 | 6 | 1/16 | 13 | 0.890625 |
| 8 | [1, 1, 0, 1] | [1, 0, 1, 0, 0] | 4 | 0.0625 | 20 | 7 | 1/16 | 15 | 0.890625 |
| 9 | [1, 0, 1, 0, 0] | [1, 1, 1, 0, 0] | 5 | 0.03125 | 28 | 8 | 1/32 | 17 | 0.890625 |
| 10 | [1, 0, 1, 0, 1] | [1, 1, 1, 0, 1] | 5 | 0.03125 | 29 | 9 | 1/32 | 19 | 0.890625 |
| 11 | [1, 0, 1, 1, 0] | [1, 1, 1, 1, 1] | 5 | 0.03125 | 31 | 10 | 1/32 | 21 | 0.890625 |
| 12 | [1, 0, 1, 1, 1] | [1, 1, 1, 1, 0] | 5 | 0.03125 | 30 | 11 | 1/32 | 23 | 0.890625 |
| 13 | [1, 1, 0, 0, 0] | [1, 1, 0, 1, 0] | 5 | 0.03125 | 26 | 12 | 1/32 | 25 | 0.890625 |
| 14 | [1, 1, 0, 0, 1] | [1, 1, 0, 1, 1] | 5 | 0.03125 | 27 | 13 | 1/32 | 27 | 0.890625 |
| 15 | [1, 1, 0, 1, 0] | [1, 1, 0, 0, 1] | 5 | 0.03125 | 25 | 14 | 1/32 | 29 | 0.890625 |
| 16 | [1, 1, 0, 1, 1] | [1, 1, 0, 0, 0] | 5 | 0.03125 | 24 | 15 | 1/32 | 31 | 0.890625 |
| 17 | [1, 1, 1, 0, 0, 0] | [0, 1, 0, 0, 0, 0] | 6 | 0.015625 | 8 | 16 | 1/64 | 33 | 0.890625 |
| 18 | [1, 1, 1, 0, 0, 1] | [0, 1, 0, 0, 0, 1] | 6 | 0.015625 | 9 | 17 | 1/64 | 35 | 0.890625 |
| 19 | [1, 1, 1, 0, 1, 0] | [0, 1, 0, 0, 1, 1] | 6 | 0.015625 | 11 | 18 | 1/64 | 37 | 0.890625 |
| 20 | [1, 1, 1, 0, 1, 1] | [0, 1, 0, 0, 1, 0] | 6 | 0.015625 | 10 | 19 | 1/64 | 39 | 0.890625 |
| 21 | [1, 1, 1, 1, 0, 0, 0] | [0, 1, 1, 1, 1, 0] | 7 | 0.0078125 | 14 | 20 | 1/128 | 41 | 0.890625 |
| 22 | [1, 1, 1, 1, 0, 0, 1] | [0, 1, 1, 1, 1, 1] | 7 | 0.0078125 | 15 | 21 | 1/128 | 43 | 0.890625 |
| 23 | [1, 1, 1, 1, 0, 1, 0] | [0, 1, 1, 1, 0, 1] | 7 | 0.0078125 | 13 | 22 | 1/128 | 45 | 0.890625 |
| 24 | [1, 1, 1, 1, 0, 1, 1] | [0, 1, 1, 1, 0, 0] | 7 | 0.0078125 | 12 | 23 | 1/128 | 47 | 0.890625 |
| 25 | [1, 1, 1, 1, 1, 0, 0, 0] | [0, 0, 0, 1, 0, 0] | 8 | 0.00390625 | 4 | 24 | 1/256 | 49 | 0.890625 |
| 26 | [1, 1, 1, 1, 1, 0, 0, 1] | [0, 0, 0, 1, 0, 1] | 8 | 0.00390625 | 5 | 25 | 1/256 | 51 | 0.890625 |
| 27 | [1, 1, 1, 1, 1, 0, 1, 0] | [0, 0, 0, 1, 1, 1] | 8 | 0.00390625 | 7 | 26 | 1/256 | 53 | 0.890625 |
| 28 | [1, 1, 1, 1, 1, 0, 1, 1] | [0, 0, 0, 1, 1, 0] | 8 | 0.00390625 | 6 | 27 | 1/256 | 55 | 0.890625 |
| 29 | [1, 1, 1, 1, 1, 1, 0, 0] | [0, 0, 0, 0, 1, 0] | 8 | 0.00390625 | 2 | 28 | 1/256 | 57 | 0.890625 |
| 30 | [1, 1, 1, 1, 1, 1, 0, 1] | [0, 0, 0, 0, 1, 1] | 8 | 0.00390625 | 3 | 29 | 1/256 | 59 | 0.890625 |
| 31 | [1, 1, 1, 1, 1, 1, 1, 0] | [0, 0, 0, 0, 0, 1] | 8 | 0.00390625 | 1 | 30 | 1/256 | 61 | 0.890625 |
| 32 | [1, 1, 1, 1, 1, 1, 1, 1] | [0, 0, 0, 0, 0, 0] | 8 | 0.00390625 | 0 | 31 | 1/256 | 63 | 0.890625 |

| Row No. 1401 | Shaper-IN 1402 | Shaper-OUT 1403 | Length 1404 | P(X) 1405 | Dec 1406 | Idx 1407 | Ps 1408 | Amp 1409 | Rate (Rs) 1410 |
|---|---|---|---|---|---|---|---|---|---|
| 1 | [0, 0, 1, 0] | [1, 0, 0, 0, 0] | 4 | 0.0625 | 16 | 0 | 1//16 | 1 | 0.911458 |
| 2 | [0, 0, 1, 1] | [1, 0, 0, 0, 1] | 4 | 0.0625 | 17 | 1 | 1//16 | 3 | 0.911458 |
| 3 | [0, 1, 0, 0] | [1, 0, 0, 1, 1] | 4 | 0.0625 | 19 | 2 | 1//16 | 5 | 0.911458 |
| 4 | [0, 1, 0, 1] | [1, 0, 0, 1, 0] | 4 | 0.0625 | 18 | 3 | 1//16 | 7 | 0.911458 |
| 5 | [0, 1, 1, 0] | [1, 0, 1, 1, 0] | 4 | 0.0625 | 22 | 4 | 1//16 | 9 | 0.911458 |
| 6 | [0, 1, 1, 1] | [1, 0, 1, 1, 1] | 4 | 0.0625 | 23 | 5 | 1//16 | 11 | 0.911458 |
| 7 | [1, 0, 0, 0] | [1, 0, 1, 0, 1] | 4 | 0.0625 | 21 | 6 | 1//16 | 13 | 0.911458 |
| 8 | [1, 0, 0, 1] | [1, 0, 1, 0, 0] | 4 | 0.0625 | 20 | 7 | 1//16 | 15 | 0.911458 |
| 9 | [1, 0, 1, 0] | [1, 1, 1, 0, 0] | 4 | 0.0625 | 28 | 8 | 1//16 | 17 | 0.911458 |
| 10 | [1, 0, 1, 1] | [1, 1, 1, 0, 1] | 4 | 0.0625 | 29 | 9 | 1//16 | 19 | 0.911458 |
| 11 | [1, 1, 0, 0] | [1, 1, 1, 1, 1] | 4 | 0.0625 | 31 | 10 | 1//16 | 21 | 0.911458 |
| 12 | [1, 1, 0, 1] | [1, 1, 1, 1, 0] | 4 | 0.0625 | 30 | 11 | 1//16 | 23 | 0.911458 |
| 13 | [1, 1, 0, 0, 0] | [1, 1, 0, 1, 0] | 5 | 0.03125 | 26 | 12 | 1//32 | 25 | 0.911458 |
| 14 | [1, 1, 0, 0, 1] | [1, 1, 0, 1, 1] | 5 | 0.03125 | 27 | 13 | 1//32 | 27 | 0.911458 |
| 15 | [1, 1, 0, 1, 0] | [1, 1, 0, 0, 1] | 5 | 0.03125 | 25 | 14 | 1//32 | 29 | 0.911458 |
| 16 | [1, 1, 0, 1, 1] | [1, 1, 0, 0, 0] | 5 | 0.03125 | 24 | 15 | 1//32 | 31 | 0.911458 |
| 17 | [1, 1, 1, 0, 0, 0] | [0, 1, 0, 0, 0] | 6 | 0.015625 | 8 | 16 | 1//64 | 33 | 0.911458 |
| 18 | [1, 1, 1, 0, 0, 1] | [0, 1, 0, 0, 1] | 6 | 0.015625 | 9 | 17 | 1//64 | 35 | 0.911458 |
| 19 | [1, 1, 1, 0, 1, 0] | [0, 1, 0, 1, 1] | 6 | 0.015625 | 11 | 18 | 1//64 | 37 | 0.911458 |
| 20 | [1, 1, 1, 0, 1, 1] | [0, 1, 0, 1, 0] | 6 | 0.015625 | 10 | 19 | 1//64 | 39 | 0.911458 |
| 21 | [1, 1, 1, 1, 0, 0, 0] | [0, 1, 1, 1, 0] | 7 | 0.0078125 | 14 | 20 | 1//128 | 41 | 0.911458 |
| 22 | [1, 1, 1, 1, 0, 0, 1] | [0, 1, 1, 1, 1] | 7 | 0.0078125 | 15 | 21 | 1//128 | 43 | 0.911458 |
| 23 | [1, 1, 1, 1, 0, 1, 0] | [0, 1, 1, 0, 1] | 7 | 0.0078125 | 13 | 22 | 1//128 | 45 | 0.911458 |
| 24 | [1, 1, 1, 1, 0, 1, 1] | [0, 1, 1, 0, 0] | 7 | 0.0078125 | 12 | 23 | 1//128 | 47 | 0.911458 |
| 25 | [1, 1, 1, 1, 1, 0, 0, 0] | [0, 0, 1, 0, 0] | 8 | 0.00390625 | 4 | 24 | 1//256 | 49 | 0.911458 |
| 26 | [1, 1, 1, 1, 1, 0, 0, 1] | [0, 0, 1, 0, 1] | 8 | 0.00390625 | 5 | 25 | 1//256 | 51 | 0.911458 |
| 27 | [1, 1, 1, 1, 1, 0, 1, 0] | [0, 0, 1, 1, 1] | 8 | 0.00390625 | 7 | 26 | 1//256 | 53 | 0.911458 |
| 28 | [1, 1, 1, 1, 1, 0, 1, 1] | [0, 0, 1, 1, 0] | 8 | 0.00390625 | 6 | 27 | 1//256 | 55 | 0.911458 |
| 29 | [1, 1, 1, 1, 1, 1, 0, 0] | [0, 0, 0, 1, 0] | 8 | 0.00390625 | 2 | 28 | 1//256 | 57 | 0.911458 |
| 30 | [1, 1, 1, 1, 1, 1, 0, 1] | [0, 0, 0, 1, 1] | 8 | 0.00390625 | 3 | 29 | 1//256 | 59 | 0.911458 |
| 31 | [1, 1, 1, 1, 1, 1, 1, 0] | [0, 0, 0, 0, 1] | 8 | 0.00390625 | 1 | 30 | 1//256 | 61 | 0.911458 |
| 32 | [1, 1, 1, 1, 1, 1, 1, 1] | [0, 0, 0, 0, 0] | 8 | 0.00390625 | 0 | 31 | 1//256 | 63 | 0.911458 |

| Row No. 1501 | Shaper-IN 1502 | Shaper-OUT 1503 | Length 1504 | P(X) 1505 | Dec 1506 | Idx 1507 | Ps 1508 | Amp 1509 | Rate (Rs) 1510 |
|---|---|---|---|---|---|---|---|---|---|
| 1 | [0, 0] | [1, 0, 0, 0, 0] | 2 | 0.25 | 16 | 0 | 1/4 | 1 | 0.685547 |
| 2 | [0, 1] | [1, 0, 0, 0, 1] | 2 | 0.25 | 17 | 1 | 1/4 | 3 | 0.685547 |
| 3 | [1, 0, 0] | [1, 0, 0, 1, 1] | 3 | 0.125 | 19 | 2 | 1/8 | 5 | 0.685547 |
| 4 | [1, 0, 1] | [1, 0, 0, 1, 0] | 3 | 0.125 | 18 | 3 | 1/8 | 7 | 0.685547 |
| 5 | [1, 1, 0, 0] | [1, 0, 1, 1, 0] | 4 | 0.0625 | 22 | 4 | 1/16 | 9 | 0.685547 |
| 6 | [1, 1, 0, 1] | [1, 0, 1, 1, 1] | 4 | 0.0625 | 23 | 5 | 1/16 | 11 | 0.685547 |
| 7 | [1, 1, 1, 0, 0] | [1, 0, 1, 0, 1] | 5 | 0.03125 | 21 | 6 | 1/32 | 13 | 0.685547 |
| 8 | [1, 1, 1, 0, 1, 0] | [1, 0, 1, 0, 0] | 6 | 0.015625 | 20 | 7 | 1/64 | 15 | 0.685547 |
| 9 | [1, 1, 1, 0, 1, 1] | [1, 1, 1, 0, 0] | 6 | 0.015625 | 28 | 8 | 1/64 | 17 | 0.685547 |
| 10 | [1, 1, 1, 1, 0, 0, 0] | [1, 1, 1, 1, 0, 1] | 7 | 0.0078125 | 29 | 9 | 1/128 | 19 | 0.685547 |
| 11 | [1, 1, 1, 1, 0, 0, 1] | [1, 1, 1, 1, 1, 1] | 7 | 0.0078125 | 31 | 10 | 1/128 | 21 | 0.685547 |
| 12 | [1, 1, 1, 1, 0, 1, 0, 0] | [1, 1, 1, 1, 1, 0] | 8 | 0.00390625 | 30 | 11 | 1/256 | 23 | 0.685547 |
| 13 | [1, 1, 1, 1, 0, 1, 0, 1] | [1, 1, 1, 0, 1, 0] | 8 | 0.00390625 | 26 | 12 | 1/256 | 25 | 0.685547 |
| 14 | [1, 1, 1, 1, 0, 1, 1, 0] | [1, 1, 1, 0, 1, 1] | 8 | 0.00390625 | 27 | 13 | 1/256 | 27 | 0.685547 |
| 15 | [1, 1, 1, 1, 0, 1, 1, 1, 0] | [1, 1, 1, 0, 0, 1] | 9 | 0.00195312 | 25 | 14 | 1/512 | 29 | 0.685547 |
| 16 | [1, 1, 1, 1, 0, 1, 1, 1, 1] | [1, 1, 1, 0, 0, 0] | 9 | 0.00195312 | 24 | 15 | 1/512 | 31 | 0.685547 |
| 17 | [1, 1, 1, 1, 1, 0, 0, 0, 0] | [0, 1, 0, 0, 0] | 9 | 0.00195312 | 8 | 16 | 1/512 | 33 | 0.685547 |
| 18 | [1, 1, 1, 1, 1, 0, 0, 0, 1] | [0, 1, 0, 0, 1] | 9 | 0.00195312 | 9 | 17 | 1/512 | 35 | 0.685547 |
| 19 | [1, 1, 1, 1, 1, 0, 0, 1, 0] | [0, 1, 0, 1, 1] | 9 | 0.00195312 | 11 | 18 | 1/512 | 37 | 0.685547 |
| 20 | [1, 1, 1, 1, 1, 0, 0, 1, 1] | [0, 1, 0, 1, 0] | 9 | 0.00195312 | 10 | 19 | 1/512 | 39 | 0.685547 |
| 21 | [1, 1, 1, 1, 1, 0, 1, 0, 0] | [0, 1, 1, 1, 0] | 9 | 0.00195312 | 14 | 20 | 1/512 | 41 | 0.685547 |
| 22 | [1, 1, 1, 1, 1, 0, 1, 0, 1] | [0, 1, 1, 1, 1] | 9 | 0.00195312 | 15 | 21 | 1/512 | 43 | 0.685547 |
| 23 | [1, 1, 1, 1, 1, 0, 1, 1, 0] | [0, 1, 1, 0, 1] | 9 | 0.00195312 | 13 | 22 | 1/512 | 45 | 0.685547 |
| 24 | [1, 1, 1, 1, 1, 0, 1, 1, 1] | [0, 1, 1, 0, 0] | 9 | 0.00195312 | 12 | 23 | 1/512 | 47 | 0.685547 |
| 25 | [1, 1, 1, 1, 1, 1, 0, 0, 0] | [0, 0, 1, 0, 0] | 9 | 0.00195312 | 4 | 24 | 1/512 | 49 | 0.685547 |
| 26 | [1, 1, 1, 1, 1, 1, 0, 0, 1] | [0, 0, 1, 0, 1] | 9 | 0.00195312 | 5 | 25 | 1/512 | 51 | 0.685547 |
| 27 | [1, 1, 1, 1, 1, 1, 0, 1, 0] | [0, 0, 1, 1, 1] | 9 | 0.00195312 | 7 | 26 | 1/512 | 53 | 0.685547 |
| 28 | [1, 1, 1, 1, 1, 1, 0, 1, 1] | [0, 0, 1, 1, 0] | 9 | 0.00195312 | 6 | 27 | 1/512 | 55 | 0.685547 |
| 29 | [1, 1, 1, 1, 1, 1, 1, 0, 0] | [0, 0, 0, 1, 0] | 9 | 0.00195312 | 2 | 28 | 1/512 | 57 | 0.685547 |
| 30 | [1, 1, 1, 1, 1, 1, 1, 0, 1] | [0, 0, 0, 1, 1] | 9 | 0.00195312 | 3 | 29 | 1/512 | 59 | 0.685547 |
| 31 | [1, 1, 1, 1, 1, 1, 1, 1, 0] | [0, 0, 0, 0, 1] | 9 | 0.00195312 | 1 | 30 | 1/512 | 61 | 0.685547 |
| 32 | [1, 1, 1, 1, 1, 1, 1, 1, 1] | [0, 0, 0, 0, 0] | 9 | 0.00195312 | 0 | 31 | 1/512 | 63 | 0.685547 |

| Row No. 1601 | Shaper-IN 1602 | Shaper-OUT 1603 | Length 1604 | P(X) 1605 | Dec 1606 | Idx 1607 | Ps 1608 | Amp 1609 | Rate (Rs) 1610 |
|---|---|---|---|---|---|---|---|---|---|
| 1 | [0, 0] | [1, 0, 0, 0] | 2 | 0.25 | 8 | 0 | 1/4 | 1 | 0.829688 |
| 2 | [0, 1] | [1, 0, 0, 1] | 2 | 0.25 | 9 | 1 | 1/4 | 3 | 0.829688 |
| 3 | [1, 0, 0] | [1, 0, 1, 1] | 3 | 0.125 | 11 | 2 | 1/8 | 5 | 0.829688 |
| 4 | [1, 0, 1, 0] | [1, 0, 1, 0] | 4 | 0.0625 | 10 | 3 | 1/16 | 7 | 0.829688 |
| 5 | [1, 0, 1, 1] | [1, 1, 1, 0] | 4 | 0.0625 | 14 | 4 | 1/16 | 9 | 0.829688 |
| 6 | [1, 1, 0, 0] | [1, 1, 1, 1] | 4 | 0.0625 | 15 | 5 | 1/16 | 11 | 0.829688 |
| 7 | [1, 1, 0, 1, 0] | [1, 1, 0, 1] | 5 | 0.03125 | 13 | 6 | 1/32 | 13 | 0.829688 |
| 8 | [1, 1, 0, 1, 1] | [1, 1, 0, 0] | 5 | 0.03125 | 12 | 7 | 1/32 | 15 | 0.829688 |
| 9 | [1, 1, 1, 0, 0] | [0, 1, 0, 0] | 5 | 0.03125 | 4 | 8 | 1/32 | 17 | 0.829688 |
| 10 | [1, 1, 1, 0, 1] | [0, 1, 0, 1] | 5 | 0.03125 | 5 | 9 | 1/32 | 19 | 0.829688 |
| 11 | [1, 1, 1, 1, 0, 0] | [0, 1, 1, 1] | 6 | 0.015625 | 7 | 10 | 1/64 | 21 | 0.829688 |
| 12 | [1, 1, 1, 1, 0, 1] | [0, 1, 1, 0] | 6 | 0.015625 | 6 | 11 | 1/64 | 23 | 0.829688 |
| 13 | [1, 1, 1, 1, 1, 0] | [0, 0, 1, 0] | 6 | 0.015625 | 2 | 12 | 1/64 | 25 | 0.829688 |
| 14 | [1, 1, 1, 1, 1, 1, 0] | [0, 0, 1, 1] | 7 | 0.0078125 | 3 | 13 | 1/128 | 27 | 0.829688 |
| 15 | [1, 1, 1, 1, 1, 1, 1, 0] | [0, 0, 0, 1] | 8 | 0.00390625 | 1 | 14 | 1/256 | 29 | 0.829688 |
| 16 | [1, 1, 1, 1, 1, 1, 1, 1] | [0, 0, 0, 0] | 8 | 0.00390625 | 0 | 15 | 1/256 | 31 | 0.829688 |

FIG. 16A

SYSTEMS AND METHODS FOR PROBABILISTIC QUADRATURE AMPLITUDE MODULATION (QAM)

CROSS-REFERENCE TO RELATED APPLICATIONS

This application claims the benefit of and priority to U.S. Provisional Patent Application No. 63/554,589 filed on Feb. 16, 2024, which is incorporated herein by reference in its entirety for all purposes.

FIELD OF THE DISCLOSURE

This disclosure generally relates to systems and methods for improving encoding/decoding processes of a communications system and/or performing probabilistically coded modulations/demodulations to improve performance of quadrature amplitude modulation (QAM) by constellation shaping of the signals/codes.

BACKGROUND

Error correcting codes enable information data to be exchanged between a transmitter communication system and a receiver communication system in a reliable manner. A transmitter communication system encodes the information data to obtain a codeword. The codeword is encoded information data. The transmitter communication system transmits the codeword to the receiver communication system. Due to noise in the communication channel, the transmission received by the receiver communication system may not be identical to the transmitted codeword. Encoding information data allows a receiver communication system with a proper decoding process to recover the information data from the received transmission despite such noise. For example, the transmitter communication system transmits parity bits to the receiver communication system. The parity bits allow the receiver communication system to verify whether the received transmission is a valid codeword and to correct errors in the transmission if the received transmission is not a valid codeword. In one approach, generating parity bits involves a complex process.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 1 is a diagram depicting an example communication environment with communication systems, according to one or more embodiments.

FIG. 7 is a diagram depicting an example shaping code, according to one or more embodiments.

FIG. 8A, FIG. 8B, FIG. 8C and FIG. 8D are diagrams depicting an example shaping code, according to one or more embodiments.

FIG. 11 is a flow diagram showing a process for encoding data using a shaping code and an LDPC code, in accordance with an embodiment.

FIG. 12A and FIG. 12B are diagrams depicting an example shaping code, according to one or more embodiments.

FIG. 13A and FIG. 13B are diagrams depicting an example shaping code, according to one or more embodiments.

FIG. 14A and FIG. 14B are diagrams depicting an example shaping code, according to one or more embodiments.

FIG. 15A and FIG. 15B are diagrams depicting an example shaping code, according to one or more embodiments.

FIG. 16A and FIG. 16B are diagrams depicting an example shaping code, according to one or more embodiments.

Figure 2:
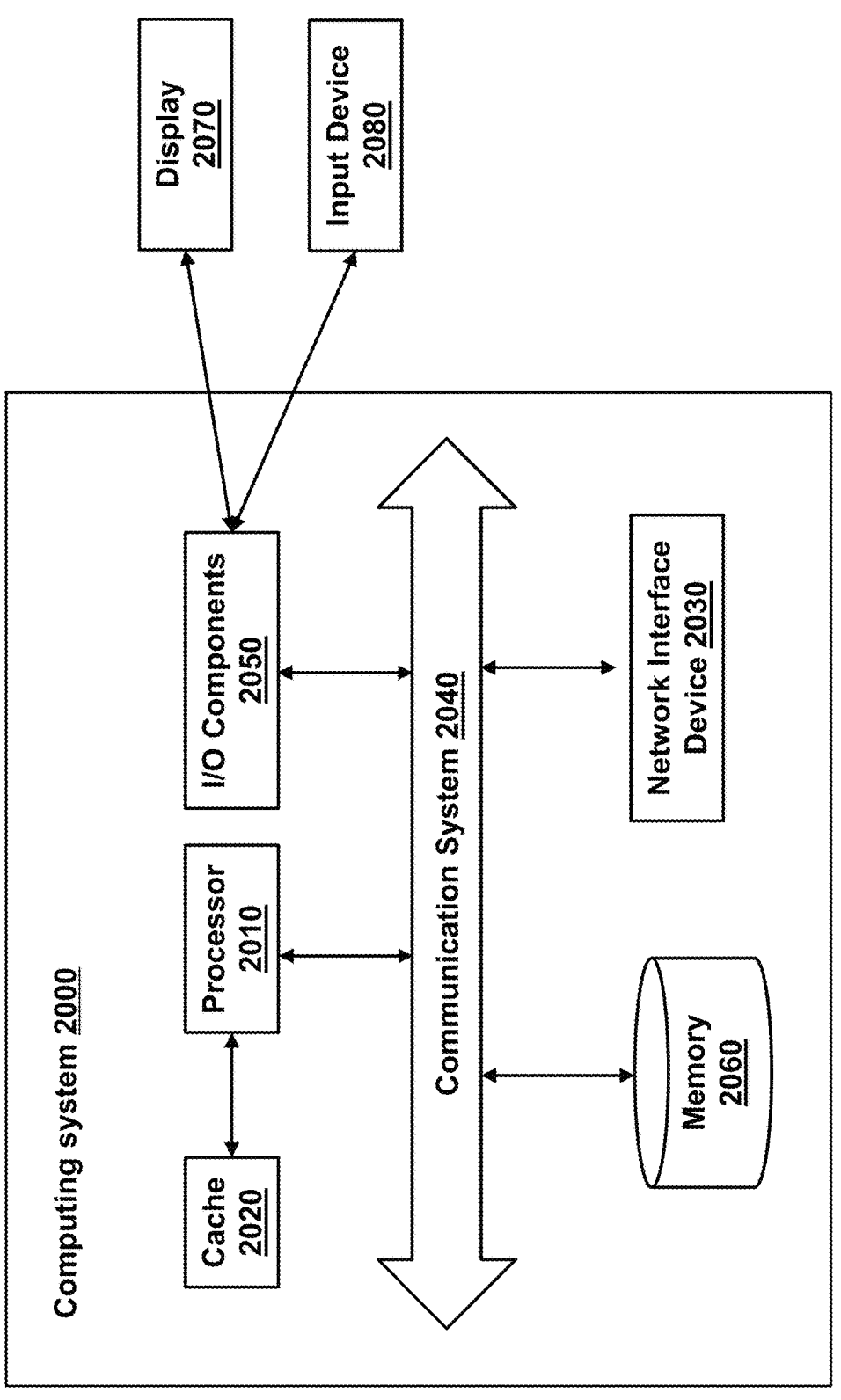
FIG. 2 is a schematic block diagram of a computing system, according to an embodiment.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, a first feature in communication with or communicatively coupled to a second feature in the description that follows may include embodiments in which the first feature is in direct communication with or directly coupled to the second feature and may also include embodiments in which additional features may intervene between the first and second features, such that the first feature is in indirect communication with or indirectly coupled to the second feature. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, illustrated is a diagram depicting an example communication environment 100 including communication systems (or communication apparatuses) 105, 108, according to one or more embodiments. In one embodiment, the communication system 105 includes a baseband circuitry 110 and a transmitter circuitry 120, and the communication system 108 includes a baseband circuitry 150 and a receiver circuitry 140. In one aspect, the communication system 105 is considered a transmitter communication system, and the communication system 108 is considered a receiver communication system. These components operate together to exchange data (e.g., messages or frames) through a wireless medium. These components are embodied as application specific integrated circuit (ASIC), field programmable gate array (FPGA), or any combination of these, in one or more embodiments. In some embodiments, the communication systems 105, 108 include more, fewer, or different components than shown in FIG. 1. For example, each of the communication systems 105, 108 includes transceiver circuitry to allow bi-directional communication between the communication systems 105, 108 or with other communication systems. In some embodiments, each of the communication systems 105, 108 may have configuration similar to that of a computing system 2000 as shown in FIG. 2.

The baseband circuitry 110 of the communication system 105 is a circuitry that generates the baseband data 115 for transmission. The baseband data 115 includes information data (e.g., signal(s)) at a baseband frequency for transmission. In one approach, the baseband circuitry 110 includes an encoder 130 that encodes the data, and generates or outputs parity bits. The parity bits (or parity data) associated with a set of bits refer to an error-detecting code that indicates whether the total number of 1-bits in the set of bits is even or odd. In one aspect, the baseband circuitry 110 (or encoder 130) obtains a generator matrix or a parity check matrix, or uses a previously produced generator matrix or a previously produced parity check matrix, and encodes the information data by applying the information data to the generator matrix or the parity check matrix to obtain a codeword. In some embodiments, the baseband circuitry 110 stores one or more generator matrices or one or more parity check matrices that conform to any IEEE 802.11 standard for WLAN communication. The baseband circuitry 110 retrieves the stored generator matrix or the stored parity check matrix in response to detecting information data to be transmitted, or in response to receiving an instruction to encode the information data. In one approach, the baseband circuitry 110 generates the parity bits according to a portion of the generator matrix or using the parity check matrix, and appends the parity bits to information bits to form a codeword. The information bits refer to any binary data inputted to an encoder to produce binary encoded data based on the binary input data. The baseband circuitry 110 generates the baseband data 115 including the codeword for the communication system 108, and provides the baseband data 115 to the transmitter circuitry 120.

The transmitter circuitry 120 of the communication system 105 includes or corresponds to a circuitry that receives the baseband data 115 from the baseband circuitry 110 and transmits a wireless signal 125 according to the baseband data 115. In one configuration, the transmitter circuitry 120 is coupled between the baseband circuitry 110 and an antenna (not shown). In this configuration, the transmitter circuitry 120 up-converts the baseband data 115 from the baseband circuitry 110 onto a carrier signal to generate the wireless signal 125 at an RF frequency (e.g., 10 MHz to 60 GHz), and transmits the wireless signal 125 through the antenna.

The receiver circuitry 140 of the communication system 108 is a circuitry that receives the wireless signal 125 from the communication system 105 and obtains baseband data 145 from the received wireless signal 125. In one configuration, the receiver circuitry 140 is coupled between the baseband circuitry 150 and an antenna (not shown). In this configuration, the receiver circuitry 140 receives the wireless signal 125 though an antenna, and down-converts the wireless signal 125 at an RF frequency according to a carrier signal to obtain the baseband data 145 from the wireless signal 125. The receiver circuitry 140 then provides the baseband data 145 to the baseband circuitry 150.

The baseband circuitry 150 of the communication system 108 includes or corresponds to a circuitry that receives the baseband data 145 from the receiver circuitry 140 and obtains information data from the received baseband data 145. In one embodiment, the baseband circuitry 150 includes a decoder 160 that extracts information and parity bits from the baseband data 145. The decoder 160 decodes the baseband data 145 to obtain the information data generated by the baseband circuitry 110 of the communication system 105.

In some embodiments, each of the baseband circuitry 110 (including the encoder 130), the transmitter circuitry 120, the receiver circuitry 140, and the baseband circuitry 150 (including the decoder 160) may be as one or more processors, application specific integrated circuit (ASIC), field programmable gate array (FPGA), or any combination of them.

FIG. 2 is a schematic block diagram of a computing system, according to an embodiment. An illustrated example computing system 2000 includes one or more processors 2010 in direct or indirect communication, via a communication system 2040 (e.g., bus), with memory 2060, at least one network interface controller 2030 with network interface port for connection to a network (not shown), and other components, e.g., input/output ("I/O") components 2050. Generally, the processor(s) 2010 will execute instructions (or computer programs) received from memory. The processor(s) 2010 illustrated incorporate, or are connected to, cache memory 2020. In some instances, instructions are read from memory 2060 into cache memory 2020 and executed by the processor(s) 2010 from cache memory 2020. The computing system 2000 may not necessarily contain all of these components shown in FIG. 2, and may contain other components that are not shown in FIG. 2.

In more detail, the processor(s) 2010 may be any logic circuitry that processes instructions, e.g., instructions fetched from the memory 2060 or cache 2020. In many implementations, the processor(s) 2010 are microprocessor units or special purpose processors. The computing device 2050 may be based on any processor, or set of processors, capable of operating as described herein. The processor(s) 2010 may be single core or multi-core processor(s). The processor(s) 2010 may be multiple distinct processors.

The memory 2060 may be any device suitable for storing computer readable data. The memory 2060 may be a device with fixed storage or a device for reading removable storage media. Examples include all forms of volatile memory (e.g., RAM), non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 2000 may have any number of memory devices 2060.

The cache memory 2020 is generally a form of computer memory placed in close proximity to the processor(s) 2010 for fast read times. In some implementations, the cache memory 2020 is part of, or on the same chip as, the processor(s) 2010. In some implementations, there are multiple levels of cache 2020, e.g., L2 and L3 cache layers.

The network interface controller 2030 manages data exchanges via the network interface (sometimes referred to as network interface ports). The network interface controller 2030 handles the physical and data link layers of the OSI model for network communication. In some implementations, some of the network interface controller's tasks are handled by one or more of the processor(s) 2010. In some implementations, the network interface controller 2030 is part of a processor 2010. In some implementations, the computing system 2000 has multiple network interfaces controlled by a single controller 2030. In some implementations, the computing system 2000 has multiple network interface controllers 2030. In some implementations, each network interface is a connection point for a physical network link (e.g., a cat-5 Ethernet link). In some implementations, the network interface controller 2030 supports wireless network connections and an interface port is a wireless (e.g., radio) receiver or transmitter (e.g., for any of the IEEE 802.11 protocols, near field communication "NFC", Bluetooth, ANT, or any other wireless protocol). In some implementations, the network interface controller 2030 implements one or more network protocols such as Ethernet. Generally, a computing device 2050 exchanges data with other computing devices via physical or wireless links through a network interface. The network interface may link directly to another device or to another device via an intermediary device, e.g., a network device such as a hub, a bridge, a switch, or a router, connecting the computing device 2000 to a data network such as the Internet.

The computing system 2000 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 2000 may include an interface (e.g., a universal serial bus (USB) interface) for connecting input devices, output devices, or additional memory devices (e.g., portable flash drive or external media drive). In some implementations, a computing device 2000 includes an additional device such as a co-processor, e.g., a math co-processor can assist the processor 2010 with high precision or complex calculations.

The components 2090 may be configured to connect with external media, a display 2070, an input device 2080 or any other components in the computing system 2000, or combinations thereof. The display 2070 may be a liquid crystal display (LCD), an organic light emitting diode (OLED) display, a flat panel display, a solid state display, a cathode ray tube (CRT) display, a projector, a printer or other now known or later developed display device for outputting determined information. The display 2070 may act as an interface for the user to see the functioning of the processor(s) 2010, or specifically as an interface with the software stored in the memory 2060.

The input device 2080 may be configured to allow a user to interact with any of the components of the computing system 2000. The input device 2080 may be a plurality pad, a keyboard, a cursor control device, such as a mouse, or a joystick. Also, the input device 2080 may be a remote control, touchscreen display (which may be a combination of the display 2070 and the input device 2080), or any other device operative to interact with the computing system 2000, such as any device operative to act as an interface between a user and the computing system 2000.

In one aspect, a parity check matrix defines a set of equations that are satisfied by any valid codeword. The parity check matrix may be used for encoding low density parity check ("LDPC") codes, described by Richardson and Urbanke in IEEE Transactions on Information Theory, Vol. 47, No. 2 (February 2001). Generally, many wireless and wireline communication systems use LDPC as a forward error correction coding scheme.

In one aspect, constellation shaping is an energy efficiency enhancement method used in digital signal modulation. Constellation shaping can improve upon traditional modulation techniques like amplitude and phase-shift keying (APSK) and quadrature amplitude modulation (QAM) by modifying the continuous uniform distribution of data symbols to match the channel characteristics.

Figure 3A:
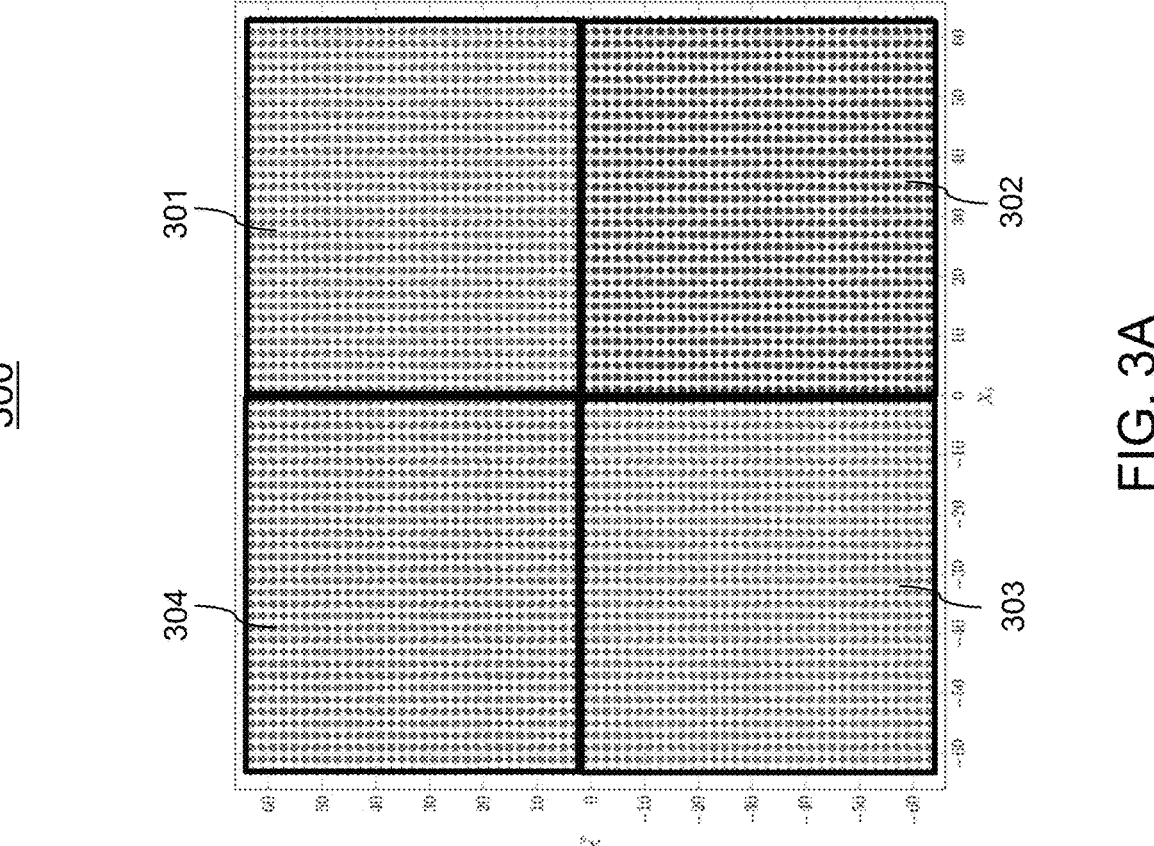
FIG. 3A, FIG. 3B and FIG. 3C are diagrams depicting an LDPC-coded modulation system using uniformly distributed QAM constellations, and information theoretic limits to uniformly distributed QAM constellations.
Figure 3B:
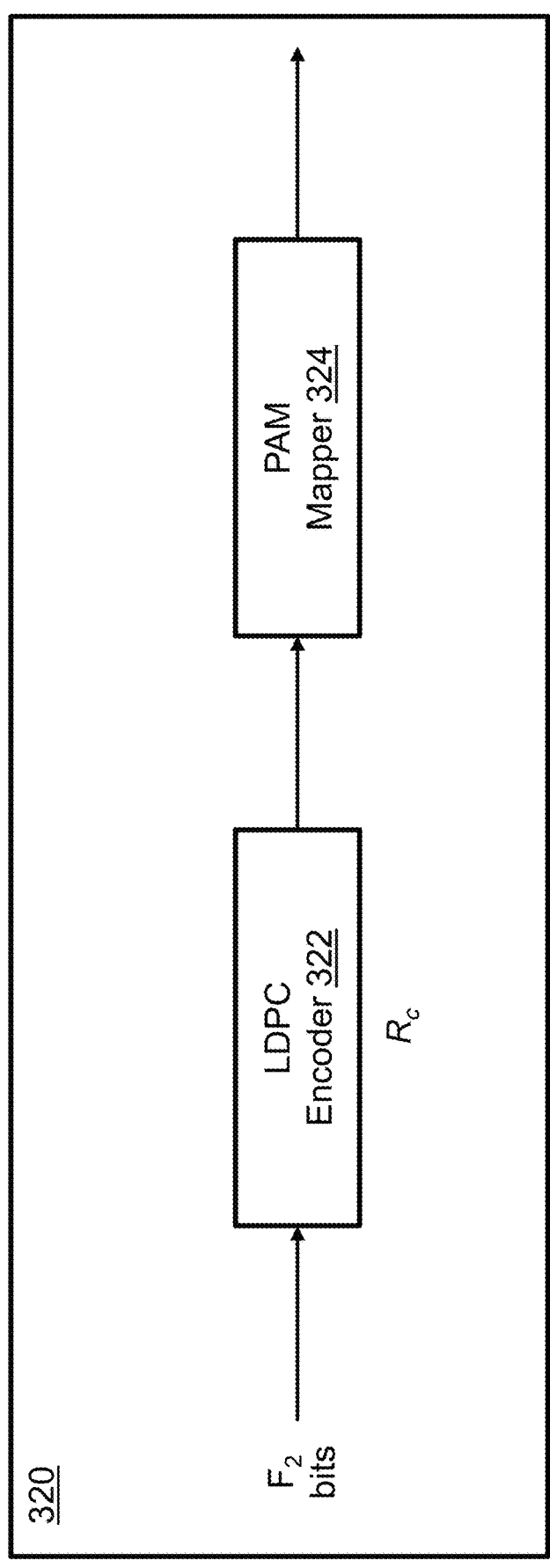
Figure 3C:
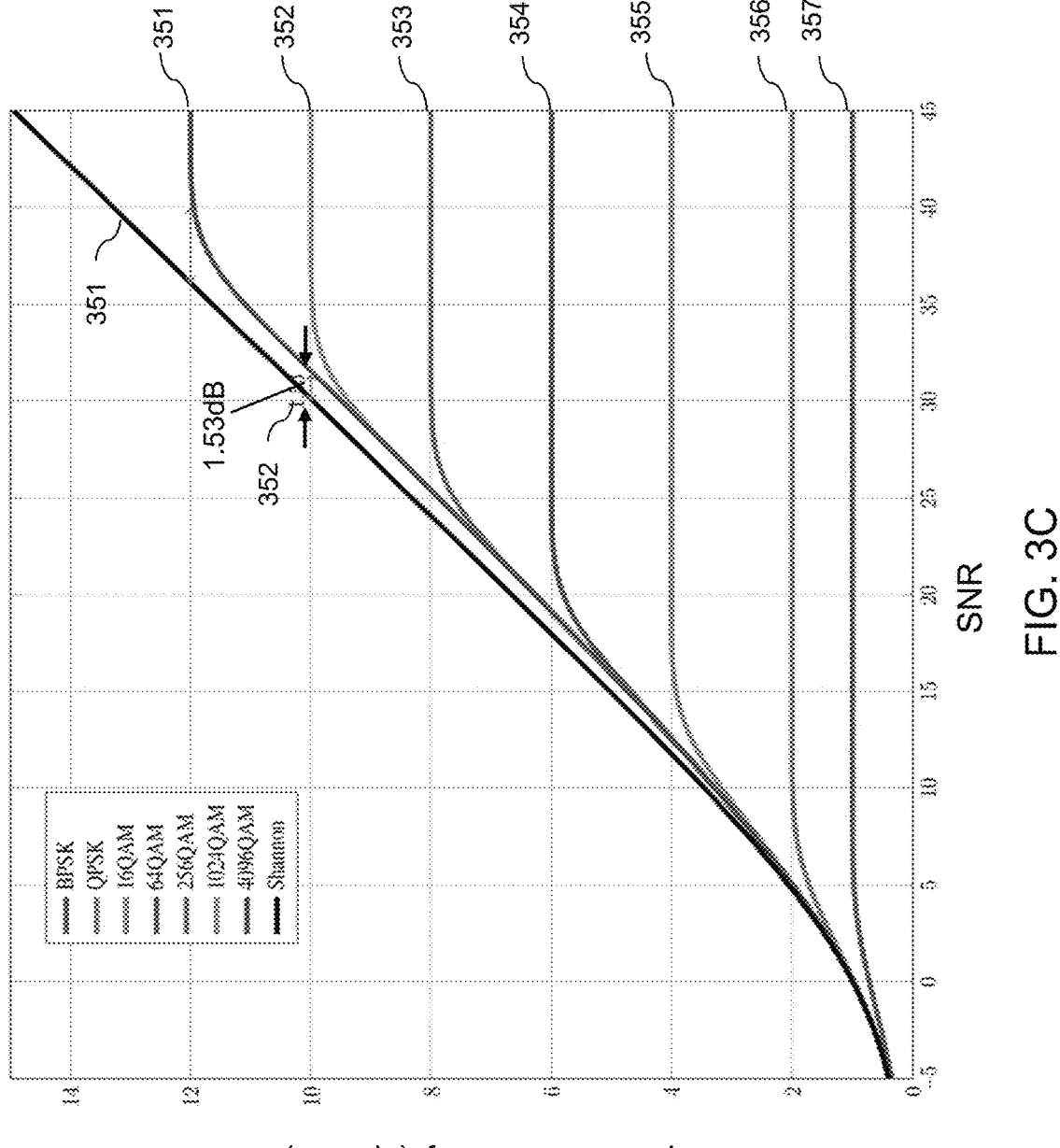

FIG. 3A, FIG. 3B and FIG. 3C are diagrams depicting an LDPC-coded modulation system using uniformly distributed QAM constellations, and information theoretic limits to uniformly distributed QAM constellations. FIG. 3A shows a constellation structure 300 of 1024 QAM (with constellation size M=1024) in which there exist 4 different partitions (e.g., divisions or subdivisions) 301, 302, 303, 304 depending on real dimensions and imaginary dimensions so that a decoder can utilize this simple partition scheme. FIG. 3B shows a block diagram of an LDPC coded modulation system 320 including an LDPC encoder 322 and a pulse amplitude modulation (PAM) symbol mapper (or "PAM mapper") 324. The LDPC encoder 322 can receive a plurality of binary values (e.g., values in the $F_2$ field) from a source and generate a codeword of length N at its output. The PAM mapper 324 can map every $\log_2 M$ value (from an M-ary signal constellation (e.g., 1024 QAM)) into analog waveforms for transmission. The LDPC coded modulation system 320 may be an LDPC-BICM system in combination with a conventional QAM (with uniformly distributed QAM constellations). The BICM refers to a binary interleaved coded modulation system, which is a model of a coded modulation system which most communication systems are based on. The system 320 may leave a gap in terms of achievable limits as shown in FIG. 3C. FIG. 3C shows spectral efficiency of various modulations schemes including Binary Phase-shift keying (BPSK), Quadrature Phase-shift keying (QPSK), 16-QAM, 64-QAM, 256-QAM, 1024-QAM and 4096-QAM, which are indicated by lines 357, 356, 355, 354, 353, 352 and 351, respectively. FIG. 3C also shows a limit to the spectral efficiency of a channel (Shannon limit) which is indicated by line 351, and a gap 352 of 1.53 dB between the Shannon limit and a QAM (e.g., 4096-QAM).

Shannon limit (or Shannon capacity) refers to a maximum rate of error-free data that can theoretically be transferred over the channel if the link is subject to random data transmission errors, for a particular noise level. The Shannon limit is a fundamental limit of a channel, which is achieved when the distribution of a code matches to an optimum distribution for a given channel. The Shannon limit is achieved when the mutual information is maximized and that happens when the input distribution matches to the optimum distribution. For example, for a white Gaussian noise (AWGN) channel, the mutual information is maximized when the codebook also has gaussian distribution and that maximum mutual information is the Shannon limit. The Shannon limit may not change with the distribution, but is a fixed number for a given channel (while the actual rate may depend on the distribution).

A maximum achievable transmission rate can be improved by matching probability to the input distribution, increasing the block length (to have a large block length), and/or using Gaussian random codes. The achievable capacity can be also limited by a finite length performance. For example, the Polyanskiy bound can provide a bound on the required energy per bit in communication systems, which is the baseline of the finite length performance. Capacity of a BICM can depend on a uniform codebook, a large block length, and/or a random code. Communication systems that use the uniformly distributed QAM constellations may cause a loss of up to $\pi e/6$ ($\approx 1.53$ dB) toward the Shannon limit. If a communication system uses a codebook constructed with uniform distribution (and do not induce distribution to the codebook), there exists 1.53 dB gap for a particular channel. In order to reduce this gap, a communication system can perform constellation shaping to benefit from moving away from uniform QAM. For example, there are broadly two approaches to constellation shaping: geometric constellation shaping (see FIG. 4A and FIG. 4B) and probabilistic constellation shaping (see FIG. 5A and FIG. 5B).

Figures 4A, 4B:
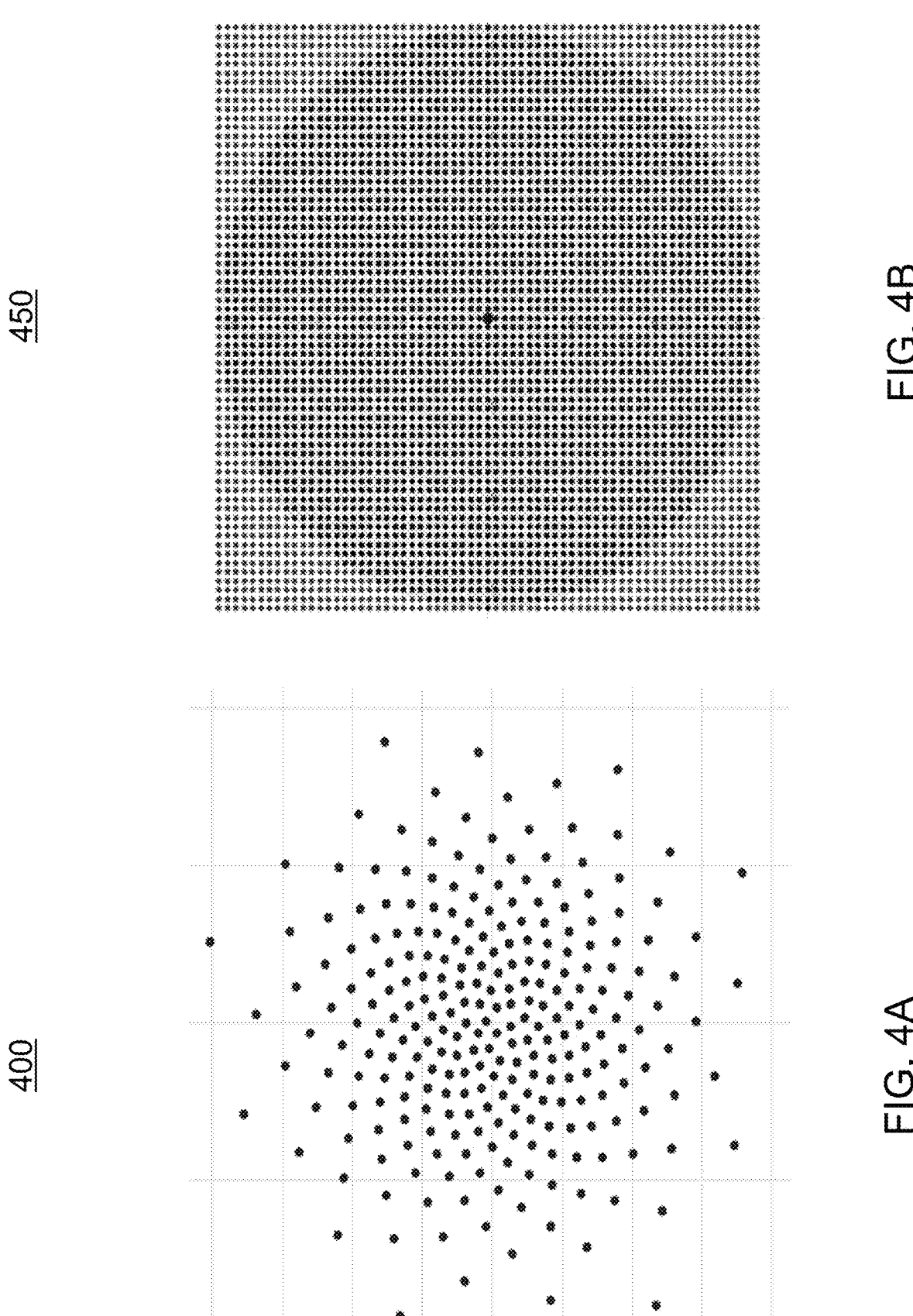
FIG. 4A and FIG. 4B are diagrams depicting geometric constellation shaping, according to one or more embodiments.

FIG. 4A and FIG. 4B are diagrams 400, 450 depicting geometric constellation shaping, according to one or more embodiments. Geometric constellation shaping aims to shape the constellation lattice close to Gaussian geometry so that the constellation can have Gaussian distribution with large M. For example, points can be placed at unequal distances (e.g., by changing distance between points), but with uniform probability. Although it is not trivial to track when radio frequency (RF) impairments is significant, geometric constellation shaping is deployed in some wired systems and/or standards.

Figures 5A, 5B:
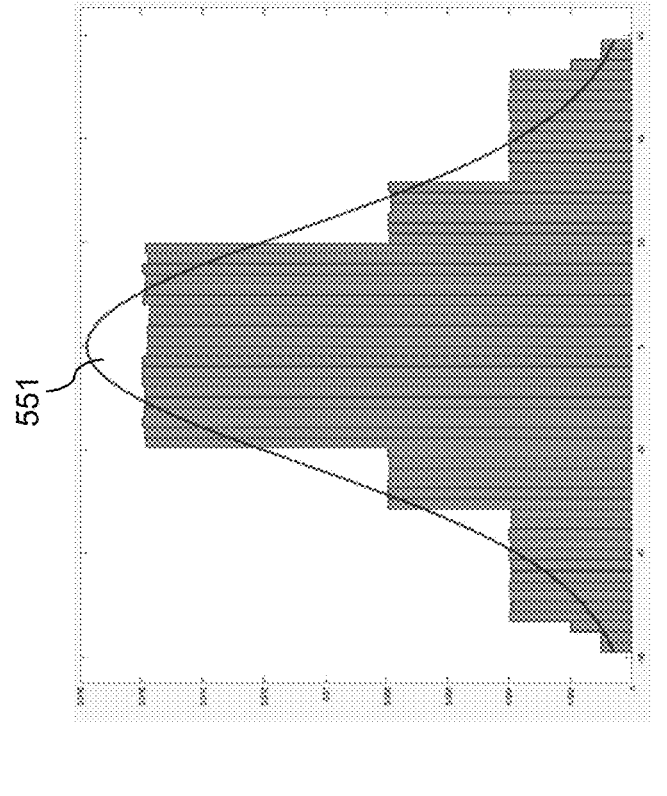
FIG. 5A and FIG. 5B are diagrams depicting probabilistic constellation shaping, according to one or more embodiments.

FIG. 5A and FIG. 5B are diagrams depicting probabilistic constellation shaping, according to one or more embodiments. FIG. 5A shows a diagram 500 depicting grids of a constellation being weighted with different probabilities. FIG. 5B shows a diagram 550 depicting a probability distribution over the grids, in which the curve 551 indicates an ideal mapping (e.g., Gaussian mapping). FIG. 5B also shows that a grid with a large length (e.g., grids at or near $\pm 60$) maps to a small probability.

In one aspect, a communication system (e.g., LDPC-coded modulation/demodulation system) can include a shaping encoder configured to apply a constellation shaping scheme (e.g., probabilistic constellation shaping) to QAM. For example, if the shaping encoder produces a length-$n_s$ amplitude block from a length-($k_s$-$n_s$) input bit block, with $k_s > n_s$, a shaping rate (or compression rate) $R_s$ can be defined as follows:

$$R_s = \frac{k_s}{n_s} \qquad \text{(Equation 1)}$$

Because the shaping rate $R_s$ is less than 1 (Rs<1), the shaping encoder of the communication system would function as forward error correction (FEC). Therefore, the constellation shaping performed by the shaping encoder would negatively affect the overall code rate. The code rate refers to a code rate of an LDPC code that is a ratio of a size of information bits to a size of encoded bits produced by an LDPC encoder with an input of the information bits. For example, assuming a desired code rate=5/6, if the shaping encoder applies a probabilistic QAM to a conventional communication system (e.g., LDPC coded modulation system 320), the overall code rate would be less than 5/6. This reduction in the overall code rate would make it difficult to determine optimal parameters for probabilistic shaping.

Moreover, in an LDPC-coded modulation system using M-ary QAM (or M-QAM or M-QAM modulator), M-QAM may include a PAM symbol mapper (e.g., PAM mapper 324) configured to calculate a cartesian product of two sqrt(M)-PAM such that each sqrt(M)-PAM has m bits. In other words, the QAM after the cartesian product can have 2 m bits. Thus, the number of bits m in the real dimension of the M-QAM (or equivalently the number of bits m in the sqrt(M)-PAM) can be defined as follows:

$$m = \frac{\log_2 M}{2} \qquad \text{(Equation 2)}$$

For example, 4096-QAM (M=4096) is a cartesian product of 64-PAM×64-PAM such that each PAM has 6 bits (m=6). In other words, the QAM can have 6 bits in the real dimension and 6 bits in imaginary dimensions, and have 12 bits in total. Such cartesian product may be implemented using (matrix) multiplication operations (e.g., using circuitry, firmware, or software for multiplying two matrices) whose computation cost is expensive.

To address these problem, according to certain aspects, embodiments in the present disclosure relate to a technique to use a shaping encoder (e.g., probabilistic shaping encoder) with LDPC to apply a constellation shaping to QAM modulations with different rates, thereby achieving a shaping gain of 1.53 dB. The shaping gain may refer to (1) an increase in information rate (e.g., average entropy per symbol) achieved by a constellation shaping compared to a uniformly distributed constellation; or (2) an enhanced energy efficiency for the information rate achieved by the constellation shaping compared to the uniformly distributed constellation.

In some implementations, an LDPC-coded modulation system may perform an appropriate selection of an LDPC/FEC code rate (e.g., $R_c$), a number of shaped bits (e.g., $K-L_u$), and a number of un-shaped bits (e.g., $L_u$) to multiplex and encode data at a desired code rate (e.g., $R_{target}$). In some implementations, the LDPC-coded modulation system may determine an appropriate number of punctured (or discarded, removed, deleted) bits (e.g., $\Delta$) to align the boundaries between encoded bits and parity bits.

In some implementations, the LDPC-coded modulation system may use or define a desired shaping codebook. In some implementations, different shaping codebooks corresponding to different MCSs are defined and provided. These codebooks may be a look-up table (LUT) which can be implemented by means of a dictionary or a tree parser or a Huffman decoder or prefix-free encoding.

In some implementations, the LDPC-coded modulation system can avoid direct multiplications (e.g., matrix multiplication to perform a cartesian product in a PAM symbol mapper) and instead use bit operations mathematically equivalent with expensive multiplication operations (e.g., a symbol mapper can concatenate one or more bit arrays and one or more bits), multiplexing and/or demultiplexing (e.g., use a multiplexer to combine two input streams, use a demultiplexer to divide one binary stream into two binary streams).

In some implementations, the LDPC-coded modulation system can determine optimized parameters using tradeoff analysis. For example, the LDPC-coded modulation system can determine an LDPC code rate (e.g., $R_c$) that can minimize the number of punctured/discarded bits while achieving a target code rate (e.g., $R_{target}$). In some implementations, the LDPC-coded modulation system can set a parameter to an appropriate value (e.g., $L_u=0$) to function as a non-shaped system.

In some implementations, the LDPC-coded modulation system may include a shaping encoder, an LDPC encoder (or adjustable encoder), and/or a symbol mapper. In some implementations, the symbol mapper may be a PAM symbol mapper. In some implementations, the modulation system may be implemented in baseband circuitry or transmitter circuitry of a communication system.

In some implementations, the shaping encoder may include an amplitude shaper and an amplitude-to-bits (Amp2Bits) converter. The amplitude shaper may receive input data (e.g., input binary values) and apply probabilistic constellation shaping to QAM symbols to produce amplitudes (e.g., amplitudes in $n_s$ dimensions, denoted by $A^{n_s}$) corresponding to the QAM symbols. For example, the shaping rate $R_s$ of the amplitude shaper may be 0.95 which is less than or equal to the entropy H of an amplitude A as follows:

$$R_s = 0.95 \leq H(A) \qquad \text{(Equation 3)}$$

In some implementations, the Amp2Bits converter may convert shaped amplitudes into binary values. In some implementations, the LDPC-coded modulation system may determine a number of unshaped bits ($L_u$), and cause the shaping encoder (e.g., amplitude shaper and/or Amp2Bits converter) to output ($K-L_u$) number of bits.

In some implementations, the adjustable encoder (or the LDPC-coded modulation system) may identify/determine/obtain a target code rate $R_{target}$ of the LDPC-coded modulation system (e.g., code rate of 5/6). The adjustable encoder (or the LDPC-coded modulation system) may determine (e.g., identify, adjust, calculate, compute), based on the target code rate $R_{target}$, one or more parameters including at least one of (1) a code rate $R_c$ of an LDPC code (or code rate of the LDPC encoder) or (2) a number of unshaped bits ($L_u$) to be input to the LDPC encoder without being output from the shaping encoder. In some implementations, the adjustable encoder (or the LDPC-coded modulation system) may determine the one or more parameters using the following equation:

$$R_{target} = \frac{m-1}{m}\left(\frac{1}{1-\dfrac{L_u}{N \cdot R_c}}\right), \qquad \text{(Equation 4)}$$

where N is the number of input information bits of the LDPC encoder.

In some implementations, the LDPC-coded modulation system may include a multiplexer (MUX) which may be implemented using circuitry, firmware and/or software. The MUX may be configured to receive, as MUX inputs, (1) ($N \cdot R_c - L_u = K - L_u$) bits from an output of the shaping encoder (K is a number of information bits), and (2) $L_u$ bits from the input data (e.g., input binary values), and provide, as a MUX output, K information bits to the LDPC encoder.

In some implementations, the LDPC encoder may encode ($K=N \cdot R_c$) bits using the code rate $R_c$ to produce encoded data. In some implementations, the LDPC-coded modulation system may include a parity puncture configured to discard or puncture some parity bits from the encoded data. In some implementations, the code rate of the LDPC encoder (or code rate of the LDPC code used in the LDPC encoder) may be set/adjusted to a code rate $R_c$ that is higher than the code rate of $R_{target}$. For example, $R_c$ is 7/8 which is higher than the code rate $R_{target}$ of 5/6. In some implementations, the parity of the encoded data may be uniformly distributed.

In some implementations, the adjustable encoder may encode data at an overall code rate R (e.g., actual code rate or actually achieved code rate) as follows:

$$\begin{aligned}
R &= \frac{(m-1)L_u + (K-L_u)(m-1)R_s}{m(K-L_u)} && \text{(Equation 5)} \\
&= \frac{(m-1)L_u}{m(K-L_u)} + \frac{(m-1)R_s}{m} \\
&= \frac{L_u}{N \cdot R_c}R_{target} + \frac{(m-1)R_s}{m}, \\
&= \frac{m-1}{m}\left(\frac{\dfrac{L_u}{N \cdot R_c}}{1-\dfrac{L_u}{N \cdot R_c}}\right) + \frac{(m-1)R_s}{m}
\end{aligned}$$

where K is the number of input information bits of the LDPC encoder $$\left(R_c = \frac{K}{N}\right).$$

In some implementations, the overall rate R may be a function of at least one of a shaping codebook (e.g., one or more shaping codes), one or more shaping factors (e.g., shaping scheme, shaping rate, shaping gain), an FEC code rate (e.g., code rate $R_c$ of the LDPC encoder), or a puncture length.

In some implementations, the LDPC-coded modulation system may include a demultiplexer (DMUX) which may be implemented using circuitry, firmware and/or software. The DMUX may be configured to receive, as a DMUX input, N number of encoded bits (e.g., codewords), and output (1) ($K-L_u$) number of encoded bits from the N number of encoded bits, and (2) P ($=N-K$) number of parity bits from the N number of encoded bits.

In some implementations, the parity puncture may receive the P ($=N-K$) number of parity bits output from the DMUX, and discard (or puncture, remove, delete) $\Delta$ number of parity bits from the P number of parity bits to generate (P$-\Delta$) number of parity bits ($\Delta$ is the number of discarded/punctured/removed parity bits).

In some implementations, the symbol mapper (e.g., PAM symbol mapper) may receive (1) the ($K-L_u$) number of encoded bits output from the DMUX and (2) the (P$-\Delta$) number of parity bits output from the parity puncture, and generate a bit array with a size equal to 2 m. The symbol mapper may provide the generated bit array to the M-QAM so that the M-QAM can convert the received bit array into analog waveforms for transmission.

In some implementations, the LDPC-coded modulation system may determine the number of unshaped information bits ($L_u$) to be K ($L_u=K$) and may not perform constellation shaping. In this case, the symbol mapper may receive (1) the K number of encoded bits output from the DMUX and (2) the (P–Δ) number of parity bits output from the parity puncture, and convert the received binary data into analog waveforms for transmission.

In some implementations, the LDPC-coded modulation system may determine the number of discarded/punctured/removed parity bits (Δ) to be zero (Δ=0) and may not perform parity puncture. In this case, the symbol mapper may receive (1) the (K–L$_u$) number of encoded bits output from the DMUX and (2) the P number of parity bits output from the DMUX, and convert the received binary data into analog waveforms for transmission.

In some implementations, in response to receiving (1) the (K–L$_u$) number of encoded bits output from the DMUX and (2) the (P–Δ) number of parity bits output from the parity puncture, the symbol mapper may generate a matrix of encoded bits with a dimension of (m–1) number of rows and (K–L$_u$)/(m–1) number of columns and generate a parity bit array with a size of (K–L$_u$). In some implementations, the symbol mapper may generate the matrix of encoded bit by converting the (K–L$_u$) number of encoded bits into (m–1) chunks such that the (m–1) chunks correspond to the (m–1) number of rows. For example, the symbol mapper may divide or split the (K–L$_u$) number of encoded bits into (m–1) chunks. In this manner, the symbol mapper may function as a stream converter or a matrix stream shaper to convert one stream to two-dimensional streams.

In some implementations, the symbol mapper may generate the matrix of encoded bit such that the number of columns of the matrix is equal to the size of the parity bit array as follows:

$$\frac{K - L_u}{m - 1} = \frac{N * R_c - L_u}{m - 1} = P - \Delta = N * (1 - R_c) - \Delta, \qquad \text{(Equation 6)}$$

where $0 \leq L_u \leq K$, $0 \leq \Delta \leq \Delta_{max}$. For example, $\Delta_{max}$ may be 250 (bits).

In some implementations, assuming that N, R$_c$ and m are fixed or already determined per LDPC encoder and M-QAM, the LDPC-coded modulation system may determine integer values of L$_u$ and/or Δ that satisfy Equation 6. In some implementations, assuming that N and m are fixed or already determined, the LDPC-coded modulation system may determine a code rate R$_c$ that satisfy Equation 4 and Equation 6 and minimize the number of discarded/punctured bits Δ. In this manner, the LDPC-coded modulation system can determine a code rate R$_c$ that can achieve the target code rate R$_c$ whiling avoiding a significant puncturing loss.

In some implementations, with the matrix of encoded bits and the parity bit array that satisfy Equation 6, the symbol mapper can implement a post-FEC padding by performing bit operations as explained in the following sections. The symbol mapper may include a stream parser configured to permutate or reorder the columns of the matrix of encoded bits. In some implementations, the stream parser may randomly permutate or reorder the columns of the matrix of encoded bits in order to spread the encoded bits over the columns of the matrix. In this manner, the LDPC-coded modulation system combined with a multiple-input and multiple-output (MIMO) system can achieve a MIMO diversity (e.g., spatial diversity, spatial multiplexing, or interference alignment) to effectively improve reliability and reduce the impact of interference or fading channels. In some implementations, assuming that the number of spatial streams (N$_{ss}$) is two (N$_{ss}$=2), the stream parser can assign a set of streams to one antenna and another set of streams to another antenna. For example, the stream parser may randomly permutate or reorder the columns of the matrix of encoded bits (e.g., the number of columns of the matrix is 100), select two columns from among the permutated columns of the matrix, and assign respective ones of the two columns to a first MIMO antenna and a second MIMO antenna, among a plurality of MIMO antennas so that the stream parser can output 50 columns (e.g., 50 bit arrays) to the first MIMO antenna and the other 50 columns (e.g., 50 bit arrays) to the second MIMO antenna. In some implementations, the stream parser may sequentially select two columns from among the columns of the matrix in the order of the columns, and assign respective ones of the two columns to a first MIMO antenna and a second MIMO antenna, among a plurality of MIMO antennas.

In some implementations, the stream parser may select two columns (e.g., a first column and a second column) from among the (K–L$_u$)/(m–1) columns of the matrix of encoded bits, and select two bits (e.g., a first bit and a second bit) from the parity bit array corresponding to the two columns of the matrix (e.g., the selected first and second bits have the same bit positions as the positions of the selected first and second columns, respectively). Next, the symbol mapper may combine the first column, the second column, the first bit, and the second bit to generate a bit array with a size of 2 m and provide the bit array to the M-QAM. In some implementations, the symbol mapper may concatenate the first column, the second column, the first bit, and the second bit in this order to generate the bit array. In some implementations, the symbol mapper may combine the first column, the second column, the first bit, and the second bit such that the first bit or the second bit can be a most significant bit (MSB) of the bit array or an MSB of a constellation point in the M-QAM.

In some implementations, L$_u$ number of information bits, among the K number of information bits, are not shaped by a shaping encoder. The LDPC encoder (or MUX) may receive L$_u$ number of information bits as an input. In some implementations, the LDPC-coded modulation system may select L$_u$ number of information bits such that the L$_u$ number of information bits are uniformly distributed across the K number of information bits. In some implementations, the shaping encoder may generate the (K–L$_u$) shaped bits using a set of unshaped bits with a size less than (K–L$_u$). In response to the shaping encoder generating the (K–L$_u$) shaped bits, the LDPC-coded modulation system (e.g., MUX) may combine the (K–L$_u$) shaped bits and the L$_u$ unshaped bits to form exactly K number of information bits in each block at the LDPC encoder. These K information bits can be treated by the LDPC encoder agnostically (e.g., without being aware which among the K number of information bits are shaped and which are unshaped). The LDPC encoder may encode K information bits to produce N encoded bits (where $$R_c = \frac{K}{N}).$$

Next, the LDPC-coded modulation system (e.g., DMUX) may perform a post LDPC grouping to generate a first group of encoded bits and a second group of parity bits. Next, the symbol mapper may take or input (K–L$_u$) bits in the first group and only take or input (K–L$_u$)/(m–1) parity bits from the second group. The input of (K–L$_u$)/(m–1) parity bits can be achieved by discarding, removing, or puncturing $\Delta$ number of bits out of (N–K) parity bits in the second group. The values of parameters (e.g., $L_u$, $\Delta$, N, K) can be chosen by finding integer solutions (e.g., solutions to Equation 4 and/or Equation 6). The symbol mapper may perform a post-LDPC padding by (1) generating a matrix with (m–1) number of rows and $(K-L_u)/(m-1)$ number of columns, and (2) combining one or two columns of the matrix and one or two parity bits of the $(K-L_u)/(m-1)$ parity bits corresponding to the one or two columns to form a bit array with a size of 2 m. In some implementations, the symbol mapper may provide the bit array (with the size of 2 m) to the M-QAM to perform a QAM mapping such that the $(K-L_u)/(m-1)$ parity bits can function as MSB(s) of PAM constellation points. In other words, the $(K-L_u)/(m-1)$ parity bits can determine a sign of the PAM constellation.

In some implementations, a combination of the shaping encoder and the LDPC encoder (or a combination of the shaping encoder and the adjustable encoder) can act/function as a coded modulation system with a different rate by selecting one or more parameters (e.g., $R_c$ or $L_u$ or $\Delta$) to achieve a target code rate (e.g., $R_{target}$).

In some implementations, parameters can be selected to achieve the overall code rate R of 5/6 even with probabilistic QAM. For example, if the target code rate $R_{target}$ is 5/6, parameters can be chosen such that m are fixed per M-QAM (e.g., according to Equation 2); $R_c$=7/8; $L_u$=81; and/or N=1944. Using these parameters, the LDPC-coded modulation system can achieve not only the overall code rate R of 5/6 but also achieve the same spectral efficiency (10 bits) as MCS13 (Modulation and Coding Scheme (MCS) index 13) and the shaping gain of 1.53 dB.

In some implementations, the shaping encoder can use a shaping codebook including one or more shaping codes. For example, the shaping codebook may include a shaping code for 4096-QAM with LDPC code rate of 7/8 to achieve the shaping rate ($R_s$) of 0.952, the overall code rate (R) of 5/6, and the same spectral efficiency as MCS13. The shaping code may include a plurality of mappings (e.g., 32 mappings) from input binary data (e.g., 4-bit string, 5-bit string, 6-bit string, 7-bit string, 8-bit string) to output binary data (e.g., 5-bit string), with different probabilities. For example, one or more mappings from a 4-bit string to a 5-bit string may have the probability of 1/16; one or more mappings from a 5-bit string to a 5-bit string may have the probability of 1/32; one or more mappings from a 6-bit string to a 5-bit string may have the probability of 1/64; one or more mappings from a 7-bit string to a 5-bit string may have the probability of 1/128; and/or one or more mappings from an 8-bit string to a 5-bit string may have the probability of 1/256. In some implementations, using a shaping code, the shaping encoder can shape/map/convert/assign an input string of [1111110] into an output string of [00011] with the probability of 1/128. In some other implementations, using another shaping code, the shaping encoder can shape/map/convert/assign an input string of [1111110] into an output string of [11100] with the probability of 1/128.

In some implementations, the shaping encoder can use a prefix free code to shape/map/convert/assign an input string with a variable length (e.g., string with 4, 5, 6, 7, 8 bits) into an output string with a fixed length (e.g., string with 5 bits). A prefix free code refers to a code such that no codeword (generated using the code) is a prefix of another codeword. In some implementations, the mappings defined by the prefix free code may be invertible operations such that each mapping is a one-to-one mapping. In some implementations, the shaping encoder may apply a Huffman coding approach using the prefix free code. For example, the shaping encoder may use the prefix free code to shape/map/convert/assign variable length input strings to fixed length output strings based on the frequencies of the input strings. In some implementations, the shaping encoder may use a tree structure of the prefix free code so that Huffman decoding can be performed using the tree structure. In some implementations, the shaping encoder may use other structure representing the prefix free code (e.g., look-up table or dictionary) so that Huffman decoding can be performed using the same structure. In some implementations, the shaping encoder may receive uniformly distributed input data and induce/assign non-uniform probabilities to output data. This probabilistic constellation shaping may have inherent rate loss such that the shaping encoder acts/functions as FEC. In some implementations, given input strings or symbols X, the prefix free code can be used to map/assign/shape/convert N different number of input strings or N different symbols (e.g., N=32).

In some implementations, an apparatus may include a transmitter and one or more processors. The one or more processors may be configured to identify a code rate of a low-density parity-check (LDPC) code. The one or more processors may be configured to receive, by an LDPC encoder, a set of information bits. The one or more processors may be configured to encode, by the LDPC encoder using the code rate, the set of information bits to generate a set of encoded bits and a set of parity bits. The one or more processors may be configured to generate, from the set of encoded bits, a matrix of bit arrays. The one or more processors may be configured to discard one or more parity bits from the set of parity bits to generate a parity bit array with a size equal to a number of column of the matrix. The one or more processors may be configured to generate a bit array by concatenating (1) one or more bit arrays selected from the matrix of bit arrays and (2) one or more bits selected from the parity bit array corresponding to the one or more bit arrays. The one or more processors may be configured to modulate, by a modulator, the bit array to generate modulated data for transmission by the transmitter. The modulator refers to an amplitude modulator, a frequency modulator, a digital modulator such as phase shift keying (PSK) modulator or quadrature amplitude modulator (QAM), or any circuitry, firmware, or software that can superimpose an information signal onto a signal for wireless/wireless transmission.

In some implementations, the transmitter may transmit the modulated data. In some implementations, the set of information bits includes a first set of bits (e.g., shaped bits) and a second set of bits (e.g., unshaped bits). The one or more processors may identify, by a shaping encoder, a shaping code. The shaping encoder refers to any circuitry, firmware or software that modifies a distribution of signals using a shaping code to improve efficiency of wireless/optical communication. The shaping code refers to a geometric shaping code, a probabilistic shaping code, or any codes or data used to modify a distribution of signals to improve efficiency of wireless/optical communications. The one or more processors may encode, by the shaping encoder using the shaping code, data to generate the first set of information bits. The one or more processors may receive, by the LDPC encoder from an output of the shaping encoder, the first set of information bits.

In some implementations, in modulating the bit array, the one or more processors may perform a quadrature amplitude modulation with a number of bits per symbol on the bit array to generate the modulated data. In generating the matrix of bit arrays, the one or more processors may determine, based at least on the number of bits per symbol and a size of the set of encoded bits, the number of columns of the matrix of bit arrays. The one or more processors may determine, based at least on the number of bits per symbol, a number of rows of the matrix of bit arrays. The bit array may have a size equal to the number of bits per symbol.

In some implementations, in generating the bit array, the one or more processors may select a first column and a second column from the matrix of bit arrays. The one or more processors may select, from the parity bit array, a first bit and a second bit corresponding to the first column and the second column of the matrix of bit arrays, respectively. one or more processors may concatenate the first column, the second column, the first bit, and the second bit to generate the bit array. The generated bit array may include the first column, the first bit, the second column, and the second bit in this order. The first column and the second column may be randomly selected from columns of the matrix of bit arrays. The first column and the second column may be sequentially selected from columns of the matrix of bit arrays in an order of the columns of the matrix of bit arrays.

In some implementations, an apparatus may include a transmitter and one or more processors. The one or more processors may be configured to identify a target code rate for which to encode data. The one or more processors may be configured to determine a code rate of a low-density parity-check (LDPC) code and a number of unshaped bits, to encode the data at the target code rate. The one or more processors may be configured to receive, by an LDPC encoder, the data including shaped bits generated by a shaping encoder and a set of unshaped bits with a size equal to the number, and encode, using the code rate, the data to generate a matrix of encoded bits and a set of parity bits. The one or more processors may be configured to discard, based at least on the number, one or more parity bits from the set of parity bits to generate a parity bit array. The one or more processors may be configured to generate a bit array by concatenating (1) one or more bit arrays obtained from columns of the matrix and (2) one or more bits obtained from the parity bit array corresponding to the one or more bit arrays. The one or more processors may be configured to modulate, by the modulator, the bit array to generate modulated data for transmission by a transmitter.

In determining the code rate, the one or more processors may identify one or more code rates to encode the data at the target rate. The one or more processors may determine, for each of the one or more code rates, a number of parity bits discarded before the modulation. The one or more processors may select, from among the one or more code rates, a code rate corresponding to a least number parity bits discarded before the modulation.

Embodiments in the present disclosure have at least the following advantages and benefits. First, embodiments in the present disclosure can provide useful techniques for adjusting modulation/demodulation processing based on a target code rate ($R_{target}$), thereby achieving a fine control of the overall rate (R). For example, a selecting parameters such as LDPC code rate (e.g., $R_c$=7/8) and/or the number of unshaped information bits (e.g., $L_u$=81) with 95% shaping (or compression) rate (e.g., $R_s$=0.95), resulting in the overall code rate of 5/6. In some implementations, an LDPC-coded modulation system can perform an appropriate selection of an LDPC/FEC code rate (e.g., $R_c$), a number of shaped bits (e.g., K–$L_u$), and a number of un-shaped bits (e.g., $L_u$) to multiplex and encode data at a desired code rate (e.g., $R_{target}$). In some implementations, the LDPC-coded modulation system can determine optimized parameters using tradeoff analysis. For example, the LDPC-coded modulation system can determine an LDPC code rate (e.g., $R_c$) that can minimize the number of punctured/discarded bits while achieving a target code rate (e.g., $R_{target}$). In some implementations, the LDPC-coded modulation system can set a parameter to an appropriate value (e.g., $L_u$=0) to function as a non-shaped system.

Second, embodiments in the present disclosure can provide useful techniques for avoid direct multiplications (e.g., matrix multiplication to perform a cartesian product in a PAM symbol mapper) and instead use bit operations mathematically equivalent with expensive multiplication operations (e.g., a symbol mapper can concatenate one or more bit arrays and one or more bits), multiplexing and/or demultiplexing (e.g., use a multiplexer to combine two input streams, use a demultiplexer to divide one binary stream into two binary streams).

Third, embodiments in the present disclosure can provide useful techniques for using or defining a desired shaping codebook. In some implementations, different shaping codebooks corresponding to different MCSs are defined and provided. These codebooks may be a look-up table (LUT) which can be implemented by means of a dictionary or a tree parser or a Huffman decoder or prefix-free encoding.

Fourth, embodiments in the present disclosure can provide useful techniques for 3. achieving shaping gain of 1.53 dB. thereby achieving the shaping gain of 1.53 dB (or higher in impair limited systems) when high spectral efficiency QAM modulation is used.

Figure 6A:
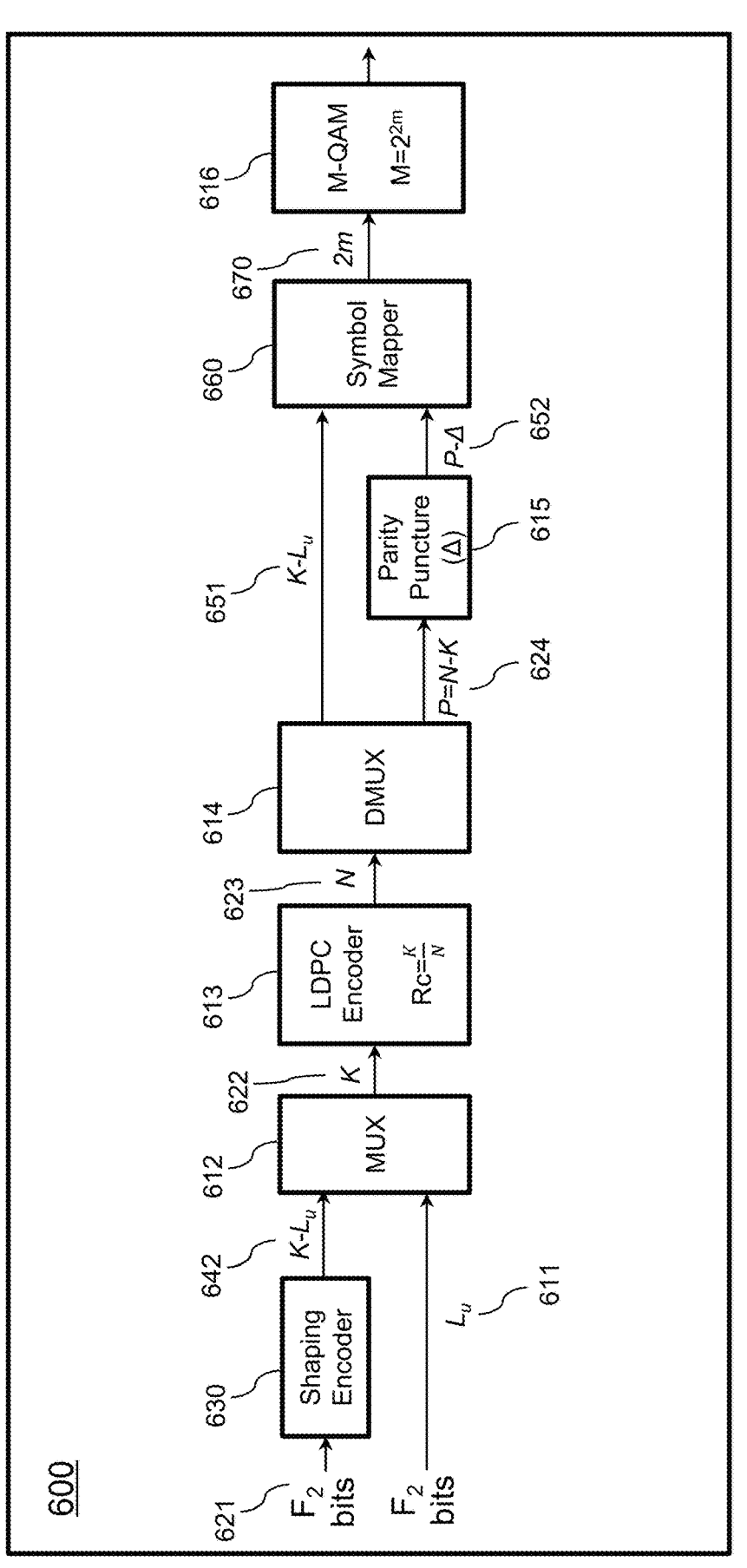
FIG. 6A, FIG. 6B and FIG. 6C are diagrams depicting an example LDPC-coded modulation system including a shaping encoder, an LDPC encoder, and/or a symbol mapper, according to one or more embodiments.
Figure 6B:
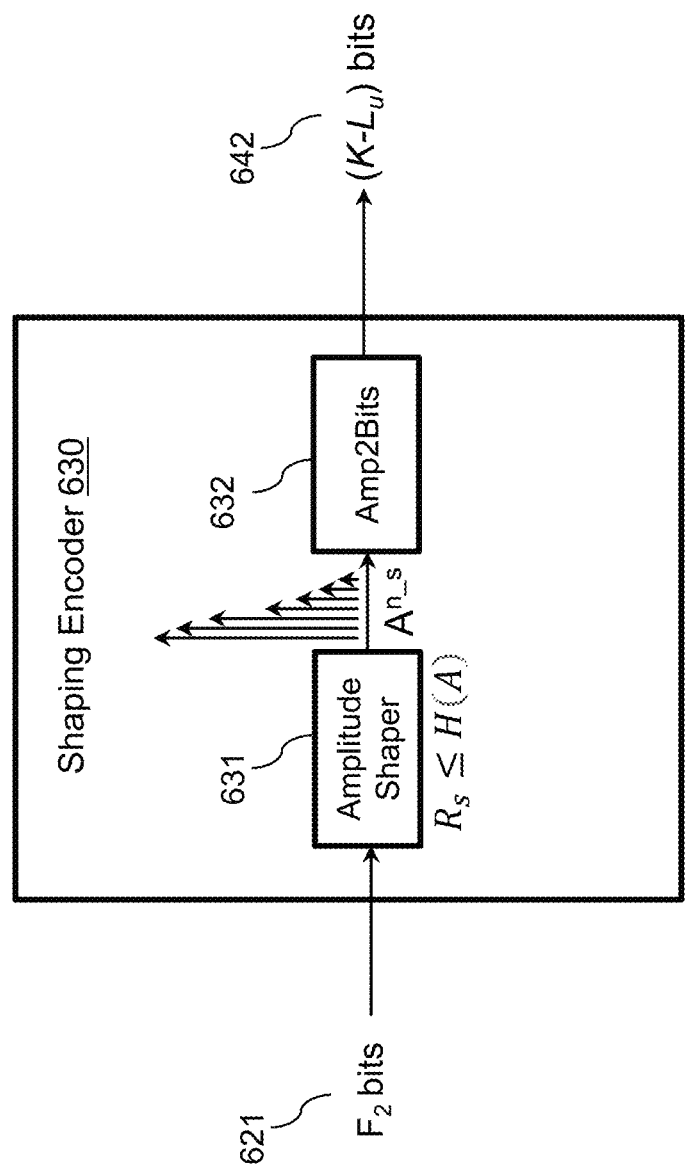
Figure 6C:
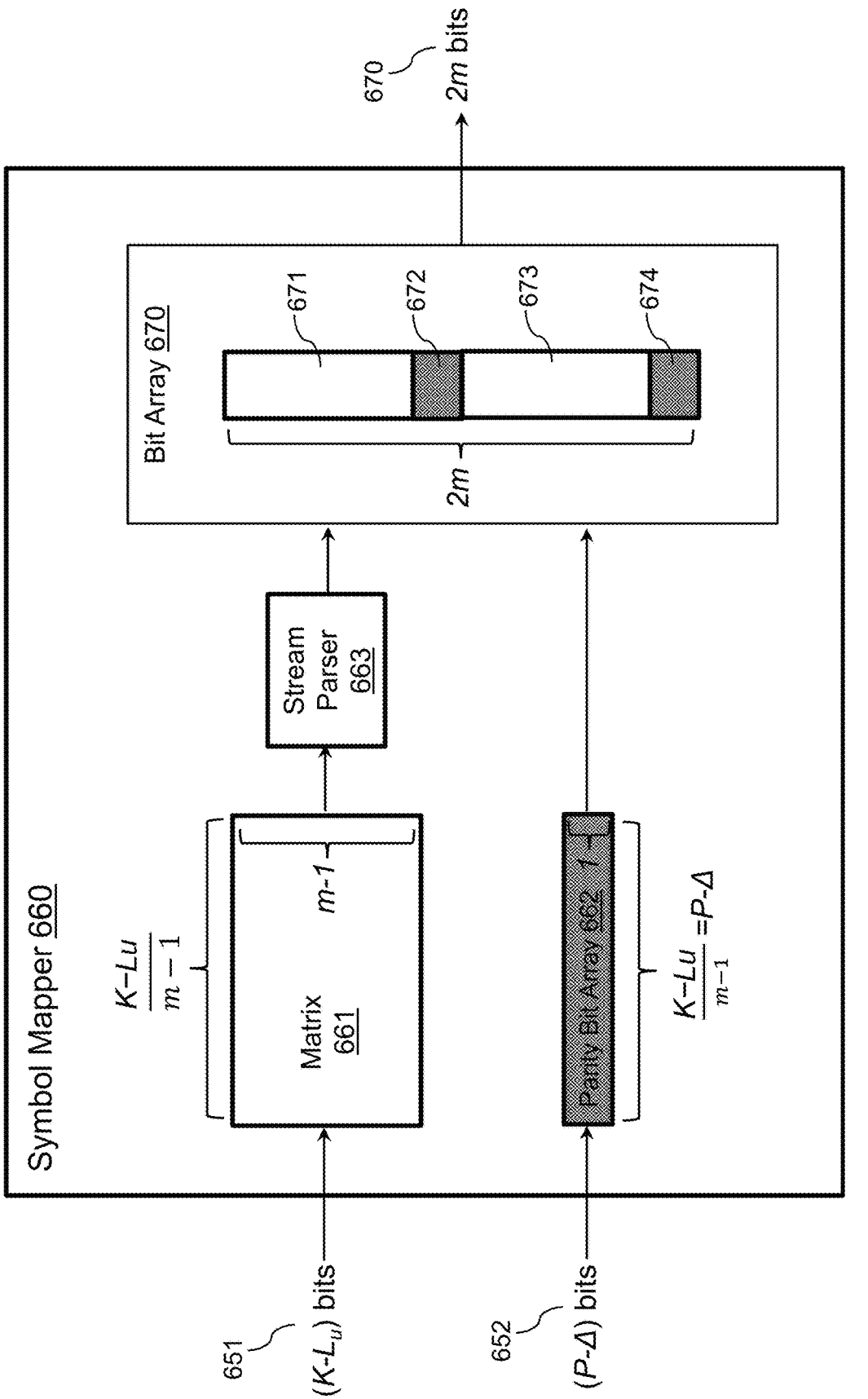

FIG. 6A, FIG. 6B and FIG. 6C are diagrams depicting an example LDPC-coded modulation system 600, according to one or more embodiments. The LDPC-coded modulation system 600 may include a shaping encoder 620, a multiplexer (MUX) 612, an LDPC encoder (or adjustable encoder) 613, a demultiplexer (DMUX) 614, a parity puncture 615, a symbol mapper 660, and/or a modulator 616 (e.g., M-QAM). The symbol mapper 660 may be a PAM symbol mapper. The modulation system 600 may be implemented in baseband circuitry (e.g., baseband circuitry 110) or transmitter circuitry (e.g., transmitter circuitry) of a communication system (e.g., communication system 105).

Referring to FIG. 6A and FIG. 6B, the shaping encoder 630 may include an amplitude shaper 631 and an amplitude-to-bits (Amp2Bits) converter 632. The amplitude shaper 631 may receive input data 621 (e.g., input binary values) and apply probabilistic constellation shaping to QAM symbols to produce amplitudes (e.g., amplitudes in $n_s$ dimensions, denoted by $A^{n_s}$) corresponding to the QAM symbols. For example, the shaping rate $R_s$ of the amplitude shaper may be 0.95 which is less than or equal to the entropy H of an amplitude A according to Equation 3. The Amp2Bits converter 632 may convert shaped amplitudes into binary values 642.

In some implementations, the LDPC-coded modulation system 600 may determine a number of unshaped bits ($L_u$), and cause the shaping encoder 630 (e.g., amplitude shaper 631 and/or Amp2Bits converter 632) to output (K–$L_u$) number of information bits 642 so that the LDPC encoder 613 (or MUX 612) may receive K number of information bits 622 (including both the $L_u$ number of information bits 611 and (K–$L_u$) number of bits 642) as an input. The $L_u$ number of information bits 611, among the K number of information bits 622, are not shaped by the shaping encoder 630. The LDPC-coded modulation system 600 may select the $L_u$ number of information bits 611 such that the $L_u$ number of information bits 611 are uniformly distributed across the K number of information bits 622. The shaping encoder 630 may generate the $(K-L_u)$ shaped bits 642 using a set of unshaped bits (e.g., input data 621) having a size less than $(K-L_u)$.

In some implementations, the LDPC-coded modulation system 600 (or the adjustable encoder 613) may identify/determine/obtain a target code rate $R_{target}$ of the LDPC-coded modulation system 600 (e.g., code rate of 5/6). The LDPC-coded modulation system 600 (or the adjustable encoder 613) may determine (e.g., identify, adjust, calculate, compute), based on the target code rate $R_{target}$, one or more parameters including at least one of (1) a code rate $R_c$ of an LDPC code (or code rate of the LDPC encoder) or (2) a number of unshaped bits $(L_u)$ to be input to the LDPC encoder without being output from the shaping encoder. In some implementations, the adjustable encoder 613 may determine the one or more parameters using Equation 4.

Referring to FIG. 6A, the LDPC-coded modulation system 600 may include a multiplexer (MUX) 612 which may be implemented using circuitry, firmware and/or software. The MUX 612 may be configured to receive, as MUX inputs, (1) the $(N \cdot R_c - L_u = K - L_u)$ information bits 642 from an output of the shaping encoder 630, and (2) the $L_u$ information bits 611 from the input data (e.g., input binary values), and provide, as a MUX output, K information bits 622 to the LDPC encoder 613. The LDPC encoder 613 may encode $(K = N \cdot R_c)$ bits using the code rate $R_c$ to produce encoded data. The LDPC-coded modulation system 600 may include a parity puncture 615 configured to discard or puncture some parity bits from the encoded data (e.g., parity data 624 with a size $(P = N - K)$). In some implementations, the LDPC encoder 613 may set or adjust the code rate of the LDPC encoder 613 (or code rate of the LDPC code used in the LDPC encoder 613) to a code rate $R_c$ that is higher than the code rate of $R_{target}$. For example, $R_c$ is 7/8 which is higher than the code rate $R_{target}$ of 5/6. In some implementations, the parity of the encoded data may be uniformly distributed.

In some implementations, the adjustable encoder 613 may encode data at an overall code rate R (e.g., actual code rate or actually achieved code rate) according to Equation 5. The overall rate R may be a function of at least one of a shaping codebook (e.g., one or more shaping codes), one or more shaping factors (e.g., shaping scheme, shaping rate, shaping gain), an FEC code rate (e.g., code rate $R_c$ of the LDPC encoder), or a puncture length $\Delta$.

Referring to FIG. 6A, the LDPC-coded modulation system 600 may include a demultiplexer (DMUX) 614 which may be implemented using circuitry, firmware and/or software. The DMUX 614 may be configured to receive, as a DMUX input, N number of encoded bits 623 (e.g., codewords), and output (1) $(K-L_u)$ number of encoded bits 651 from the N number of encoded bits 623, and (2) P $(=N-K)$ number of parity bits 624 from the N number of encoded bits 623. The parity puncture 615 may receive the P $(=N-K)$ number of parity bits 624 output from the DMUX, and discard (or puncture, remove, delete) $\Delta$ number of parity bits from the P number of parity bits 624 to generate $(P-\Delta)$ number of parity bits 652 ($\Delta$ is the number of discarded/punctured/removed parity bits).

Referring to FIG. 6A and FIG. 6C, the symbol mapper 660 (e.g., PAM symbol mapper) may receive (1) the $(K-L_u)$ number of encoded bits 651 output from the DMUX 614 and (2) the $(P-\Delta)$ number of parity bits 652 output from the parity puncture 615, and generate a bit array 670 with a size equal to 2 m. The symbol mapper 660 may provide the generated bit array 670 to the M-QAM 616 so that the M-QAM 616 can convert the received bit array 670 into analog waveforms for transmission.

In some implementations, the LDPC-coded modulation system 600 may determine the number of unshaped bits $(L_u)$ 611 to be K $(L_u = K)$ and may not perform constellation shaping. In this case, the symbol mapper 660 may receive (1) the K number of encoded bits output from the DMUX and (2) the $(P-\Delta)$ number of parity bits output from the parity puncture, and convert the received binary data into analog waveforms for transmission.

In some implementations, the LDPC-coded modulation system 600 may determine the number of discarded/punctured/removed parity bits $(\Delta)$ to be zero $(\Delta=0)$ and may not perform parity puncture. In this case, the symbol mapper 660 may receive (1) the $(K-L_u)$ number of encoded bits output from the DMUX and (2) the P number of parity bits output from the DMUX, and convert the received binary data into analog waveforms for transmission.

Referring to FIG. 6C, in response to receiving (1) the $(K-L_u)$ number of encoded bits 651 output from the DMUX and (2) the $(P-\Delta)$ number of parity bits 652 output from the parity puncture, the symbol mapper 660 may generate a matrix 661 of encoded bits with a dimension of $(m-1)$ number of rows and $(K-L_u)/(m-1)$ number of columns and generate a parity bit array 662 with a size of $(K-L_u)$. The symbol mapper 660 may generate the matrix 661 of encoded bit by converting the $(K-L_u)$ number of encoded bits 651 into $(m-1)$ chunks such that the $(m-1)$ chunks correspond to the $(m-1)$ number of rows in the matrix 661. For example, the symbol mapper 660 may divide or split the $(K-L_u)$ number of encoded bits 651 into $(m-1)$ chunks. In this manner, the symbol mapper 660 may function as a stream converter or a matrix stream shaper to convert one stream (e.g., the $(K-L_u)$ number of encoded bits 651) to two-dimensional streams (e.g., matrix 661 of encoded bits).

In some implementations, the symbol mapper 660 may generate the matrix 661 of encoded bit such that the number of columns of the matrix $(K-L_u)/(m-1)$ is equal to the size of the parity bit array $(P-\Delta)$ according to Equation 6. Using Equation 6, assuming that N, $R_c$ and m are fixed or already determined per LDPC encoder 660 and M-QAM 616, the LDPC-coded modulation system 600 may determine integer values of $L_u$ and/or $\Delta$ that satisfy Equation 6. In some implementations, assuming that N and m are fixed or already determined, the LDPC-coded modulation system 600 may determine a code rate $R_c$ that satisfy Equation 4 and Equation 6 and minimize the number of discarded/punctured bits $\Delta$. In this manner, the LDPC-coded modulation system 600 can determine a code rate $R_c$ that can achieve the target code rate $R_c$ whiling avoiding a significant puncturing loss.

Referring to FIG. 6C, with the matrix of encoded bits 661 and the parity bit array 662 that satisfy Equation 6, the symbol mapper 660 can implement a post-FEC padding by performing bit operations as explained in the following sections. The symbol mapper 660 may include a stream parser 663 configured to permutate or reorder the columns of the matrix of encoded bits 661. The stream parser 663 may randomly permutate or reorder the columns of the matrix of encoded bits 661 in order to spread the encoded bits over the columns of the matrix 661. In this manner, the LDPC-coded modulation system 600 combined with a MIMO system (not shown) can achieve a MIMO diversity (e.g., spatial diversity, spatial multiplexing, or interference alignment) to effectively improve reliability and reduce the impact of interference or fading channels. In some implementations, assuming that the number of spatial streams $(N_{ss})$ is two $(N_{ss}=2)$, the stream parser 663 can assign a set of streams to one antenna and another set of streams to another antenna. For example, the stream parser 663 may randomly permutate or reorder the columns of the matrix of encoded bits 661 (e.g., the number of columns of the matrix is 100), select two columns from among the permutated columns of the matrix 661, and assign respective ones of the two columns to a first MIMO antenna and a second MIMO antenna, among a plurality of MIMO antennas so that the stream parser can output 50 columns (e.g., 50 bit arrays) to the first MIMO antenna and the other 50 columns (e.g., 50 bit arrays) to the second MIMO antenna. In some implementations, the stream parser 663 may sequentially select two columns from among the columns of the matrix in the order of the columns, and assign respective ones of the two columns to a first MIMO antenna and a second MIMO antenna, among a plurality of MIMO antennas.

In some implementations, the stream parser 663 may select two columns (e.g., a first column 671 and a second column 673) from among the $(K-L_u)/(m-1)$ columns of the matrix of encoded bits 661, and select two bits (e.g., a first bit 672 and a second bit 674) from the parity bit array 662 corresponding to the two columns of the matrix (e.g., the selected first and second bits have the same bit positions among the $(K-L_u)/(m-1)$ bits as the positions of the selected first and second columns among the $(K-L_u)/(m-1)$ columns). Next, the symbol mapper 660 may combine the first column 671, the second column 673, the first bit 672, and the second bit 674 to generate a bit array 670 with a size of 2 m and provide the bit array 670 to the M-QAM 616. In some implementations, the symbol mapper 660 may concatenate the first column 671, the second column 672, the first bit 673, and the second bit 674 in this order to generate the bit array 670. In some implementations, the symbol mapper may combine the first column, the second column, the first bit, and the second bit such that the first bit or the second bit can be a most significant bit (MSB) of the bit array or an MSB of a constellation point in the M-QAM. For example, the symbol mapper 660 may concatenate the second bit 674, the first bit 673, the second column 672, and the first column 671 in this order to generate the bit array 670 such that the second bit 674 can be the MSB of the bit array 670.

Referring to FIG. 6A and FIG. 6C, in response to the shaping encoder 630 generating the $(K-L_u)$ shaped bits 642, the LDPC-coded modulation system 600 (e.g., MUX 612) may combine the $(K-L_u)$ shaped bits 642 and the $L_u$ unshaped bits 611 to form exactly K number of information bits 622 in each block at the LDPC encoder 613. These K information bits 622 can be treated by the LDPC encoder 613 agnostically (e.g., without being aware which among the K number of information bits are shaped and which are unshaped). The LDPC encoder 613 may encode the K information bits 622 to produce N encoded bits 623 (where $$R_c = \frac{K}{N}).$$

Next, the LDPC-coded modulation system 600 (e.g., DMUX 614) may perform a post LDPC grouping to generate a first group of encoded bits (e.g., first bit stream) and a second group of parity bits 624 (e.g., second bit stream). Next, the symbol mapper 660 may take or input $(K-L_u)$ bits 651 in the first group and only take or input $(K-L_u)/(m-1)$ parity bits 624 from the second group. The input of $(K-L_u)/(m-1)$ parity bits 662 can be achieved by discarding, removing, or puncturing $\Delta$ number of bits out of the $(N-K)$ parity bits 624 in the second group. The values of parameters (e.g., $L_u$, $\Delta$, N, K) can be chosen by finding integer solutions (e.g., solutions to Equation 4 and/or Equation 6 where $L_u$, $\Delta$ are non-negative integers and N, K are positive integers). The symbol mapper 660 may perform a post-LDPC padding by (1) generating a matrix 661 with (m−1) number of rows and $(K-L_u)/(m-1)$ number of columns, and (2) combining one or two columns of the matrix 661 and one or two parity bits of the $(K-L_u)/(m-1)$ parity bits 662 corresponding to the one or two columns to form a bit array 670 with a size of 2 m. In some implementations, the symbol mapper 660 may provide the bit array 670 (with the size of 2 m) to the M-QAM 616 to perform a QAM mapping such that the $(K-L_u)/(m-1)$ parity bits 662 can function as MSB(s) of PAM constellation points. In other words, the $(K-L_u)/(m-1)$ parity bits 662 can determine a sign of the PAM constellation.

In some implementations, a combination of the shaping encoder 630 and the LDPC encoder 613 (or a combination of the shaping encoder and the adjustable encoder) can act/function as a coded modulation system with a different rate by selecting one or more parameters (e.g., $R_c$ or $L_u$ or $\Delta$) to achieve a target code rate (e.g., $R_{target}$). Parameters can be selected to achieve the overall code rate R of 5/6 even with probabilistic QAM. For example, if the target code rate $R_{target}$ is 5/6, parameters can be chosen such that m are fixed per M-QAM (e.g., according to Equation 2); $R_c$=7/8; $L_u$=81; and/or N=1944. Using these parameters, the LDPC-coded modulation system 600 can achieve not only the overall code rate R of 5/6 but also achieve the same spectral efficiency (10 bits) as MCS13 and the shaping gain of 1.53 dB.

FIG. 7 is a diagram depicting an example shaping code 700, according to one or more embodiments. The shaping encoder (e.g., shaping encoder 630) can use a shaping codebook including one or more shaping codes. For example, the shaping codebook may include a shaping code 700 as shown in FIG. 7 for 4096-QAM with LDPC code rate of 7/8 to achieve the shaping rate ($R_s$) of 0.952, the overall code rate (R) of 5/6, and the same spectral efficiency as MCS13. The shaping code 700 may include a plurality of mappings (e.g., 32 mappings indexed 701 by 1-32) from input binary data 702 with length 704 (e.g., 4-bit string, 5-bit string, 6-bit string, 7-bit string, 8-bit string) to output binary data 709 (e.g., 5-bit string; equivalent decimal data are shown in column 706), with different probabilities shown in columns 705, 707, and/or amplitude values corresponding to the mappings (column 704). For example, one or more mappings from a 4-bit string to a 5-bit string (e.g., mappings 1-8) may have the probability of 1/16 (=0.0625); one or more mappings from a 5-bit string to a 5-bit string (e.g., mappings 9-18) may have the probability of 1/32 (=0.03125); one or more mappings from a 6-bit string to a 5-bit string (e.g., mappings 19-29) may have the probability of 1/64 (=0.015625); one or more mappings from a 7-bit string to a 5-bit string (e.g., mapping 30) may have the probability of 1/128 (=0.0078125); and/or one or more mappings from an 8-bit string to a 5-bit string (e.g., mappings 31-32) may have the probability of 1/256 (=0.00390625). For example, using the shaping code 700, the shaping encoder 630 can shape/map/convert/assign an input string of [1111110] into an output string of [00011] with the probability of 1/128 (see the mapping 30). FIG. 7B shows a histogram 750 depicting a probability distribution over the mapping index 751, codeword 752, and input data 753.

Figure 8B:
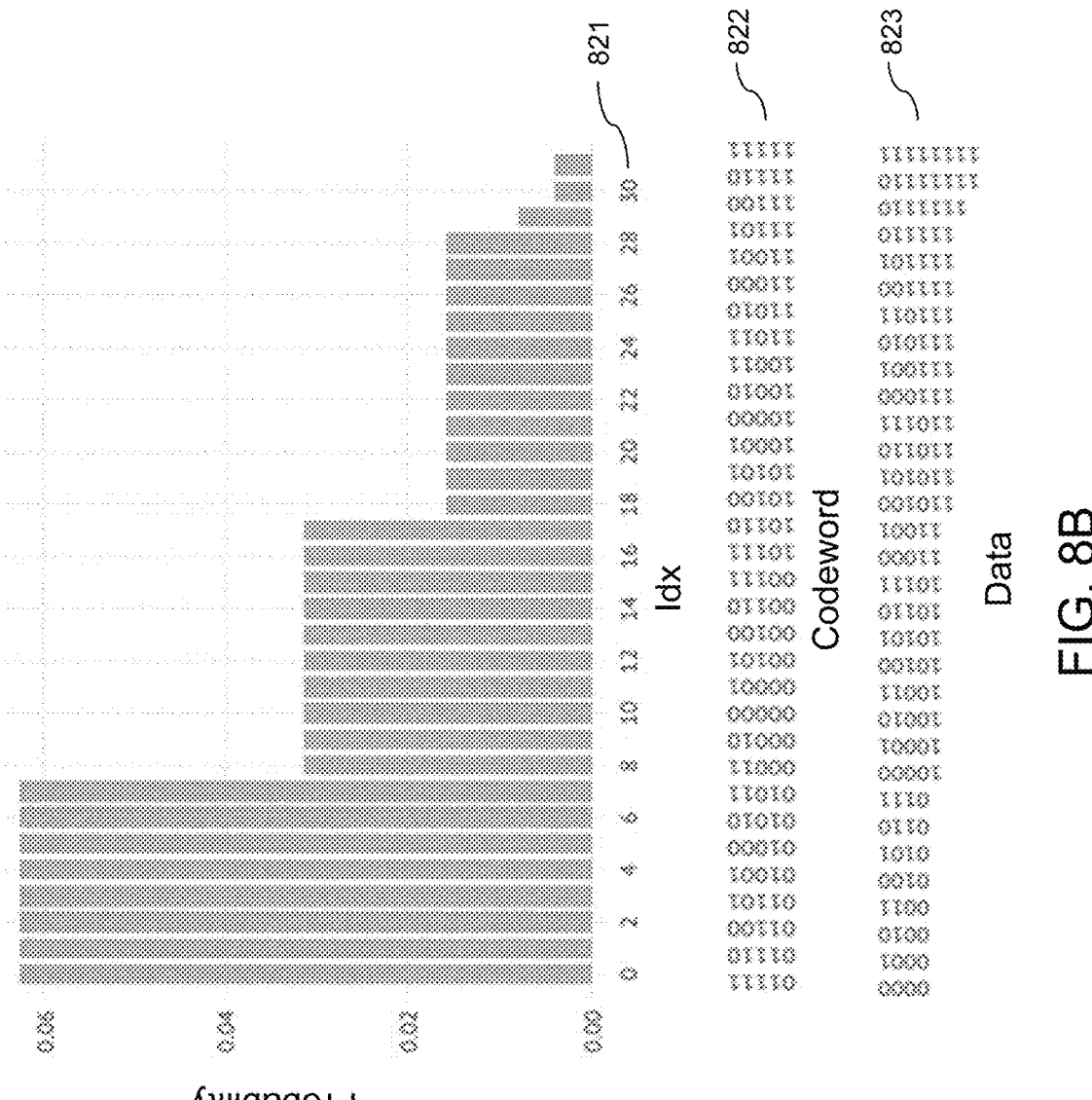

FIG. 8A, FIG. 8B, FIG. 8C and FIG. 8D are diagrams depicting an example shaping code, according to one or more embodiments. FIG. 8A and FIG. 8B are diagrams 800, 850 depicting an example shaping code, according to one or more embodiments. The shaping encoder (e.g., shaping encoder 630) can use a shaping codebook including one or more shaping codes. For example, the shaping codebook may include a shaping code 800 as shown in FIG. 8A for 4096-QAM with LDPC code rate of 7/8 to achieve the shaping rate ($R_s$) of 0.952, the overall code rate (R) of 5/6, and the same spectral efficiency as MCS13. The shaping code 800 may include a plurality of mappings (e.g., 32 mappings indexed 801 by 1-32) from input binary data 802 with length 804 (e.g., 4-bit string, 5-bit string, 6-bit string, 7-bit string, 8-bit string) to output binary data 803 (e.g., 5-bit string), with different probabilities 805. For example, one or more mappings from a 4-bit string to a 5-bit string (e.g., mappings 1-8) may have the probability of 1/16 (=0.0625); one or more mappings from a 5-bit string to a 5-bit string (e.g., mappings 9-18) may have the probability of 1/32 (=0.03125); one or more mappings from a 6-bit string to a 5-bit string (e.g., mappings 19-29) may have the probability of 1/64 (=0.015625); one or more mappings from a 7-bit string to a 5-bit string (e.g., mapping 30) may have the probability of 1/128 (=0.0078125); and/or one or more mappings from an 8-bit string to a 5-bit string (e.g., mappings 31-32) may have the probability of 1/256 (=0.00390625). For example, using the shaping code 800, the shaping encoder 630 can shape/map/convert/assign an input string of [1111110] into an output string of [11100] with the probability of 1/128 (see the mapping 30). FIG. 8B shows a histogram 820 depicting a probability distribution over the mapping index 821, codeword 822, and input data 823.

Figure 8C:
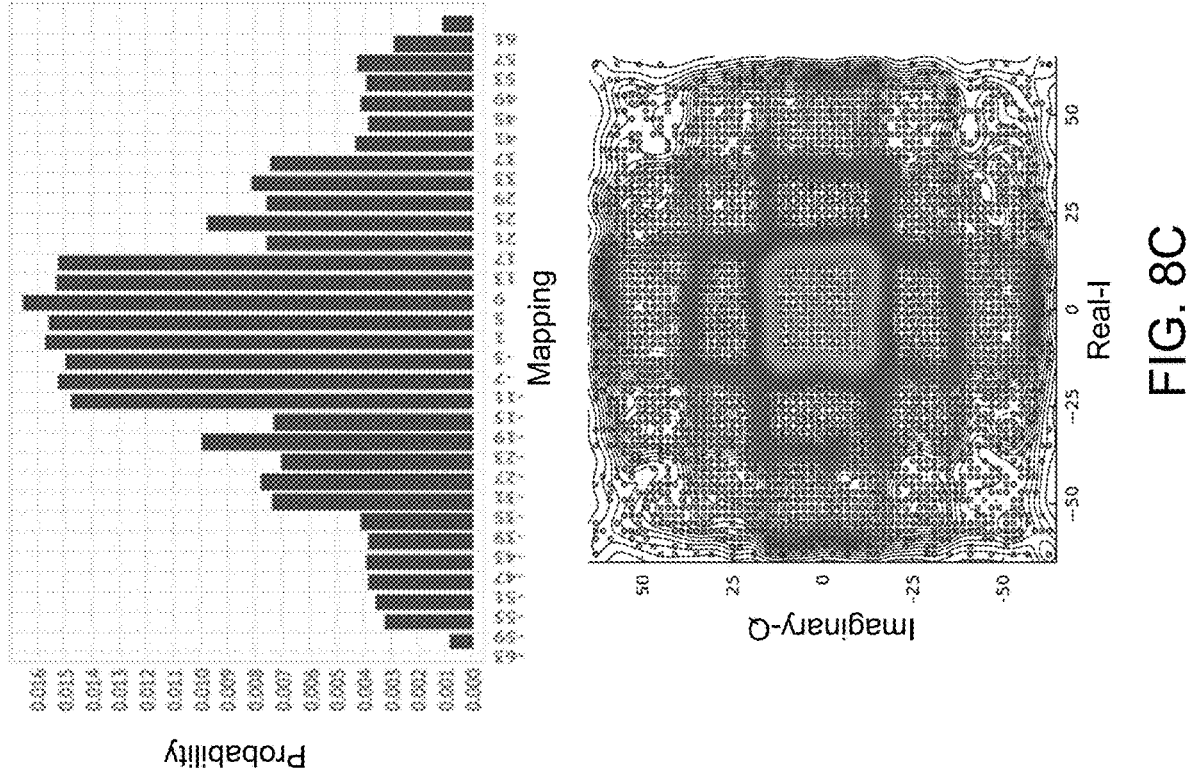
Figure 8D:
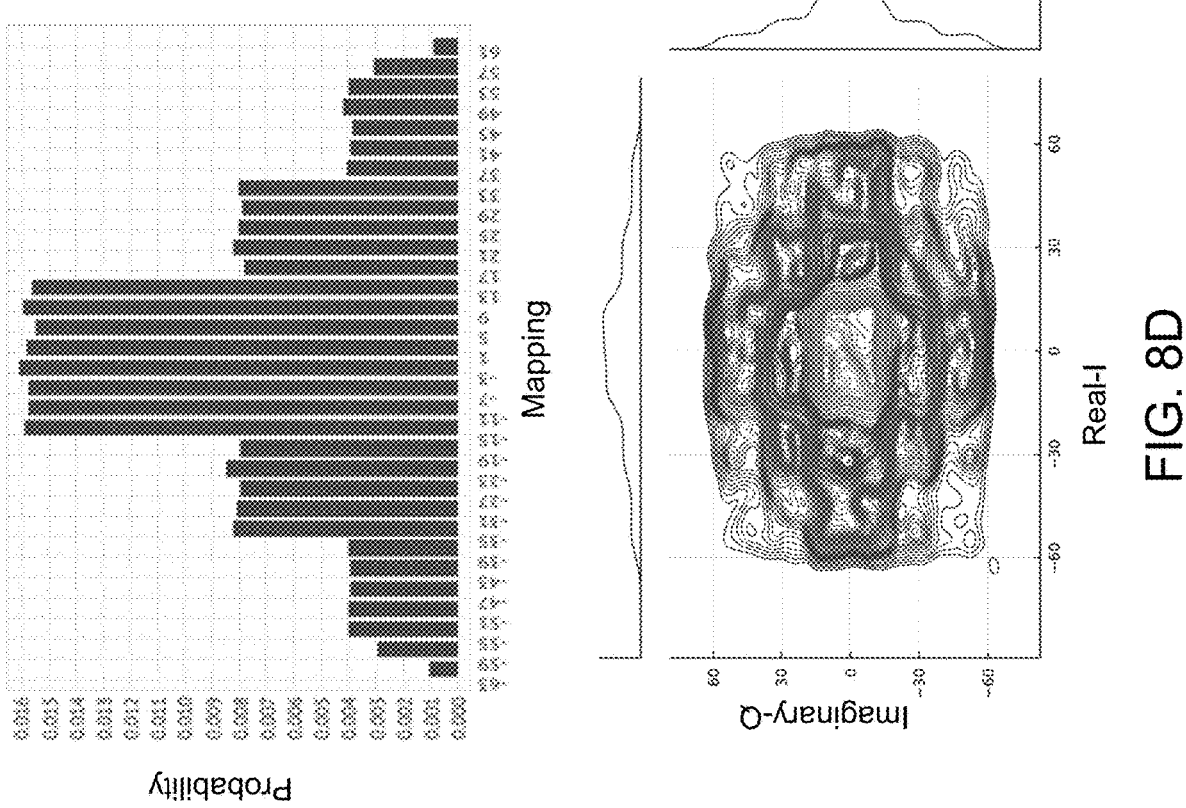

FIG. 8C shows diagrams 840, 845 depicting example simulation results using the shaping code 800 and a payload size of 8100 bytes. The diagram 840 shows a probability distribution of QAM mappings (e.g., amplitude values). The diagram 845 shows amplitude values (e.g., Z-axis) of constellation points in an X-Y coordinate system where X-axis corresponds to a real (I) axis and Y-axis corresponds to an imaginary (Q) axis. Similarly, FIG. 8D shows diagrams 860, 865 depicting example simulation results using the shaping code 800 and a payload size of 40100 bytes. The diagram 860 shows a probability distribution of QAM mappings (e.g., amplitude values). The diagram 865 shows amplitude values (e.g., Z-axis) of constellation points in an X-Y coordinate system where X-axis corresponds to a real (I) axis and Y-axis corresponds to an imaginary (Q) axis.

Figure 9A:
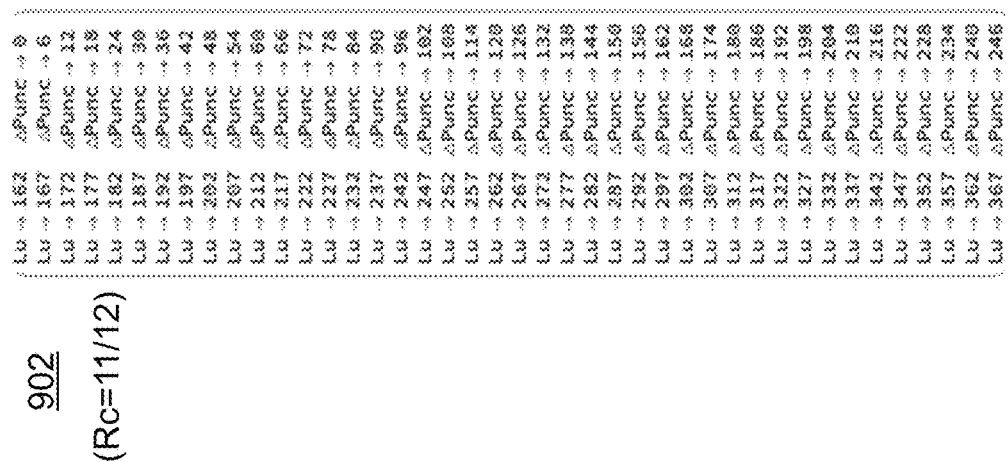
FIG. 9A, FIG. 9B and FIG. 9C are diagrams depicting example simulation results using LDPC-coded modulation systems, according to one or more embodiments.
Figure 9B:
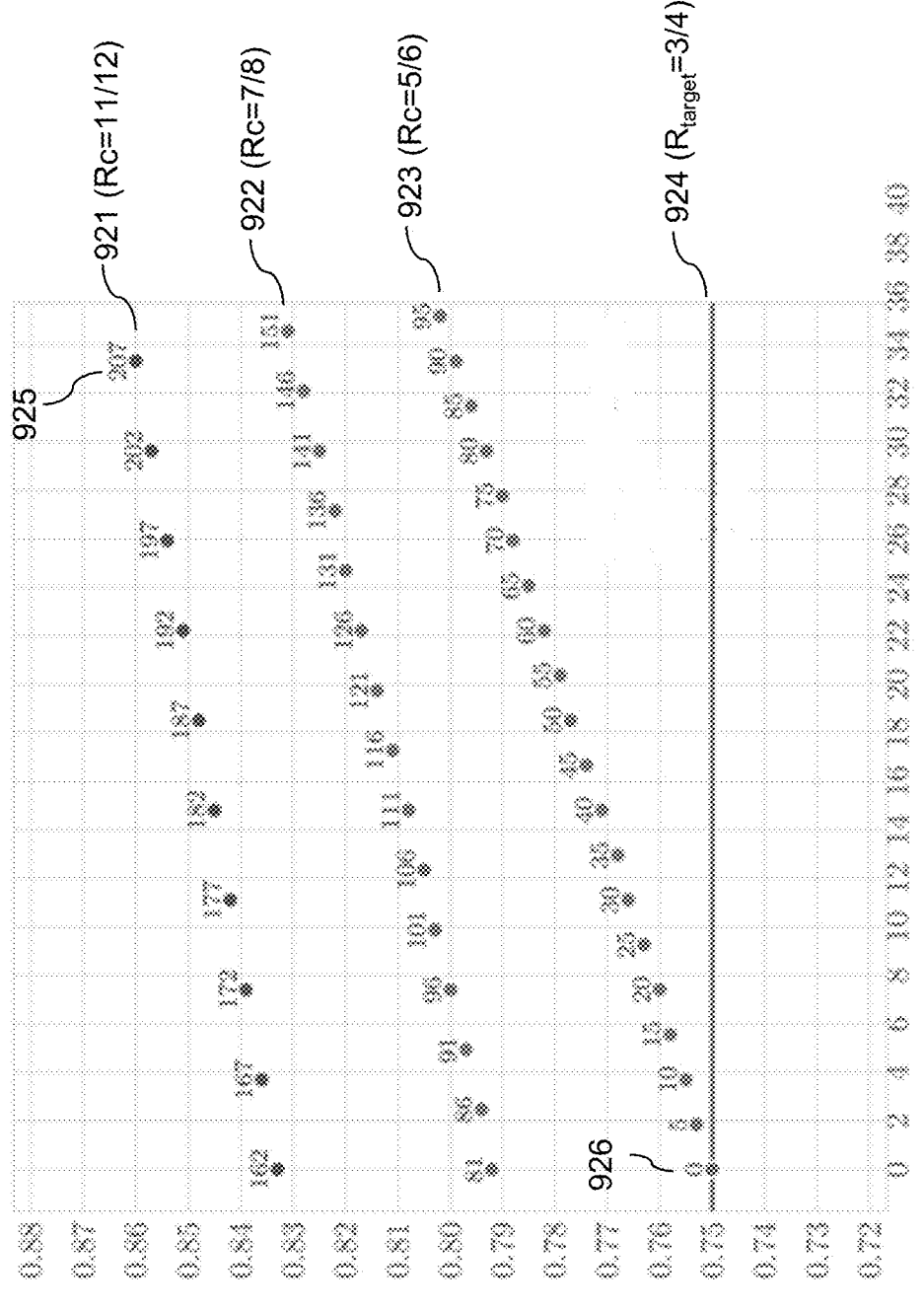
Figure 9C:
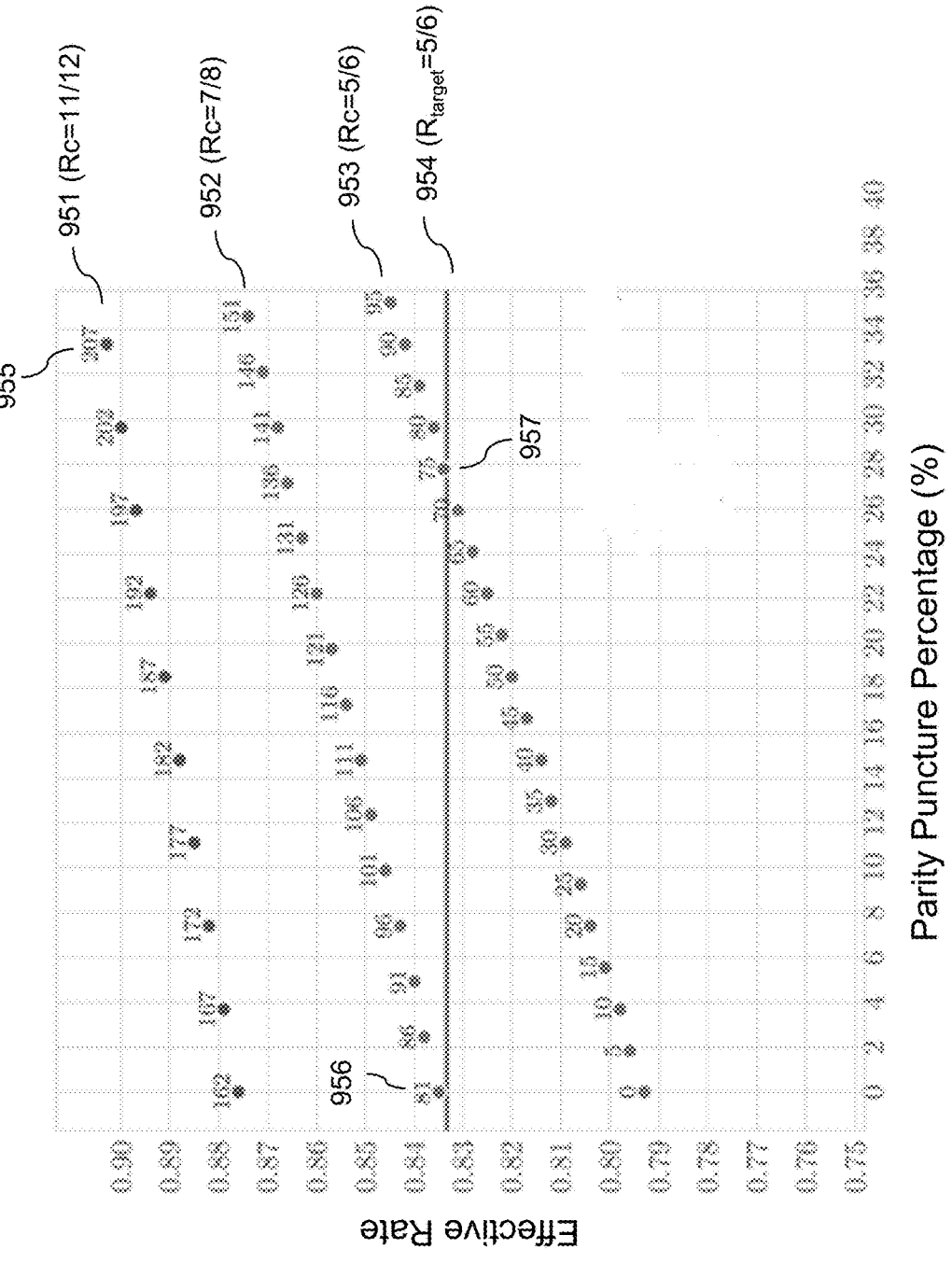

FIG. 9A, FIG. 9B and FIG. 9C are diagrams depicting example simulation results using LDPC-coded modulation systems, according to one or more embodiments. In some implementations, assuming that N, $R_c$ and m are fixed or already determined per LDPC encoder and M-QAM, the LDPC-coded modulation system may determine integer values of $L_u$ and/or $\Delta$ that satisfy Equation 6. FIG. 9A shows a diagram 901 showing integer values of $L_u$ and $\Delta$ that satisfy Equation 6 when $R_c$=7/8, N=1944 and m=6, and a diagram 902 showing integer values of $L_u$ and $\Delta$ that satisfy Equation 6 when $R_c$=11/12, N=1944 and m=6.

FIG. 9B are simulation results showing effective rates R (see Equation 5) over parity puncture percentage (%) using LDPC codes with different code rates (e.g., a set of points 921 for $R_c$=11/12; a set of points 922 for $R_c$=7/8; a set of points 923 for $R_c$=5/6) when the shaping code rate $R_s$=0.9 and the target code rate $R_{target}$=0.75=3/4 (shown as a line 924). In the simulations, the values of $L_u$ and $\Delta$ shown in FIG. 9A were used for the set of points 922 for $R_c$=7/8 and the set of points 921 ($R_c$=11/12). FIG. 9B also shows a value of $L_u$ corresponding to each point. For example, a point 925 represents a simulation result using $L_u$=207 and $R_c$=11/12, indicating that an effective rate of 0.85 is achieved with about 33% of parity puncture (e.g., number of punctured bits out of the original parity bits). As shown in FIG. 9B, the simulation result with $L_u$=0 and $R_c$=5/6 (corresponding to the point 926) can achieve the target code rate $R_{target}$=0.75.

FIG. 9C are simulation results showing effective rates R (see Equation 5) over parity puncture percentage (%) using LDPC codes with different code rates (e.g., a set of points 951 for $R_c$=11/12; a set of points 952 for $R_c$=7/8; a set of points 953 for $R_c$=5/6) when the shaping code rate $R_s$=0.9518 and the target code rate $R_{target}$=0.83 . . . =5/6 (shown as a line 954). In the simulations, the values of $L_u$ and $\Delta$ shown in FIG. 9A were used for the set of points 952 for $R_c$=7/8 and the set of points 951 ($R_c$=11/12). FIG. 9C also shows a value of $L_u$ corresponding to each point. For example, a point 955 represents a simulation result using $L_u$=207 and $R_c$=11/12, indicating that an effective rate of 0.92 is achieved with about 33% of parity puncture (e.g., number of punctured bits out of the original parity bits). As shown in FIG. 9C, both the simulation result with $L_u$=81 and $R_c$=7/8 (corresponding to the point 956) and the simulation result with $L_u$=75 and $R_c$=5/6 (corresponding to the point 957) can achieve the target code rate $R_{target}$=0.83. In some implementations, an LDPC-coded modulation system can determine a plurality of code rates $R_c$ that satisfy the target code rate $R_{target}$ (e.g., $R_c$=5/6 and $R_c$=7/8), and then select a code rate that can minimize the parity puncture percentage or the number of discarded parity bits ($\Delta$). For example, as shown in FIG. 9C, the modulation system can select the code rate $R_c$=7/8 because the simulation result with $R_c$=7/8 (e.g., point 956) shows a parity puncture percentage (e.g., 0%) less than a parity puncture percentage of the simulation result with $R_c$=5/6 (e.g., point 957).

In some implementations, an apparatus (e.g., modulation system 600, communication system 105) may include a transmitter (e.g., transmitter circuitry 120) and one or more processors (e.g., processors 2010). The one or more processors may be configured to identify a target code rate (e.g., $R_{target}$=0.83 in FIG. 9C) for which to encode data. The one or more processors may be configured to determine a code rate of a low-density parity-check (LDPC) code and a number of unshaped bits (e.g., $$R_c = \frac{7}{8}$$

and $L_u$=81 corresponding to the point 956 in FIG. 9C) and, to encode the data at the target code rate. The one or more processors may be configured to receive, by an LDPC encoder (e.g., LDPC encoder 613), the data including shaped bits generated by a shaping encoder and a set of unshaped bits (e.g., unshaped bits 611) with a size equal to the number (e.g., $L_u$=81), and encode, using the code rate (e.g., $$R_c = \frac{7}{8}),$$

the data to generate a matrix of encoded bits (e.g., matrix 661) and a set of parity bits (e.g., (P–K) number of parity bits 624). The one or more processors may be configured to discard, based at least on the number (e.g., using $L_u$=81 and Equation 6), one or more parity bits (e.g., 4 number of parity bits) from the set of parity bits to generate a parity bit array (e.g., parity bit array 662). The one or more processors may be configured to generate a bit array (e.g., bit array 670) by concatenating (1) one or more bit arrays (e.g., first column 671 and second column 673) obtained from columns of the matrix 661 and (2) one or more bits (e.g., first bit 672 and second bit 674) obtained from the parity bit array 662 corresponding to the one or more bit arrays. The one or more processors may be configured to modulate, by the modulator (e.g., M-QAM 616), the bit array 670 to generate modulated data for transmission by a transmitter (e.g., transmitter circuitry 120).

In determining the code rate, the one or more processors may identify one or more code rates (e.g., $R_c$=5/6 and $R_c$=7/8 in FIG. 9C) to encode the data at the target rate (e.g., $R_{target}$=0.83 in FIG. 9C). The one or more processors may determine, for each of the one or more code rates, a number of parity bits discarded before the modulation (e.g., parity puncture percentages 28% for $R_c$=5/6 and 0% for $R_c$=7/8 in FIG. 9C). The one or more processors may select, from among the one or more code rates, a code rate (e.g., $R_c$=7/8) corresponding to a least number parity bits discarded (e.g., parity puncture percentage of 0%) before the modulation.

Figure 10:
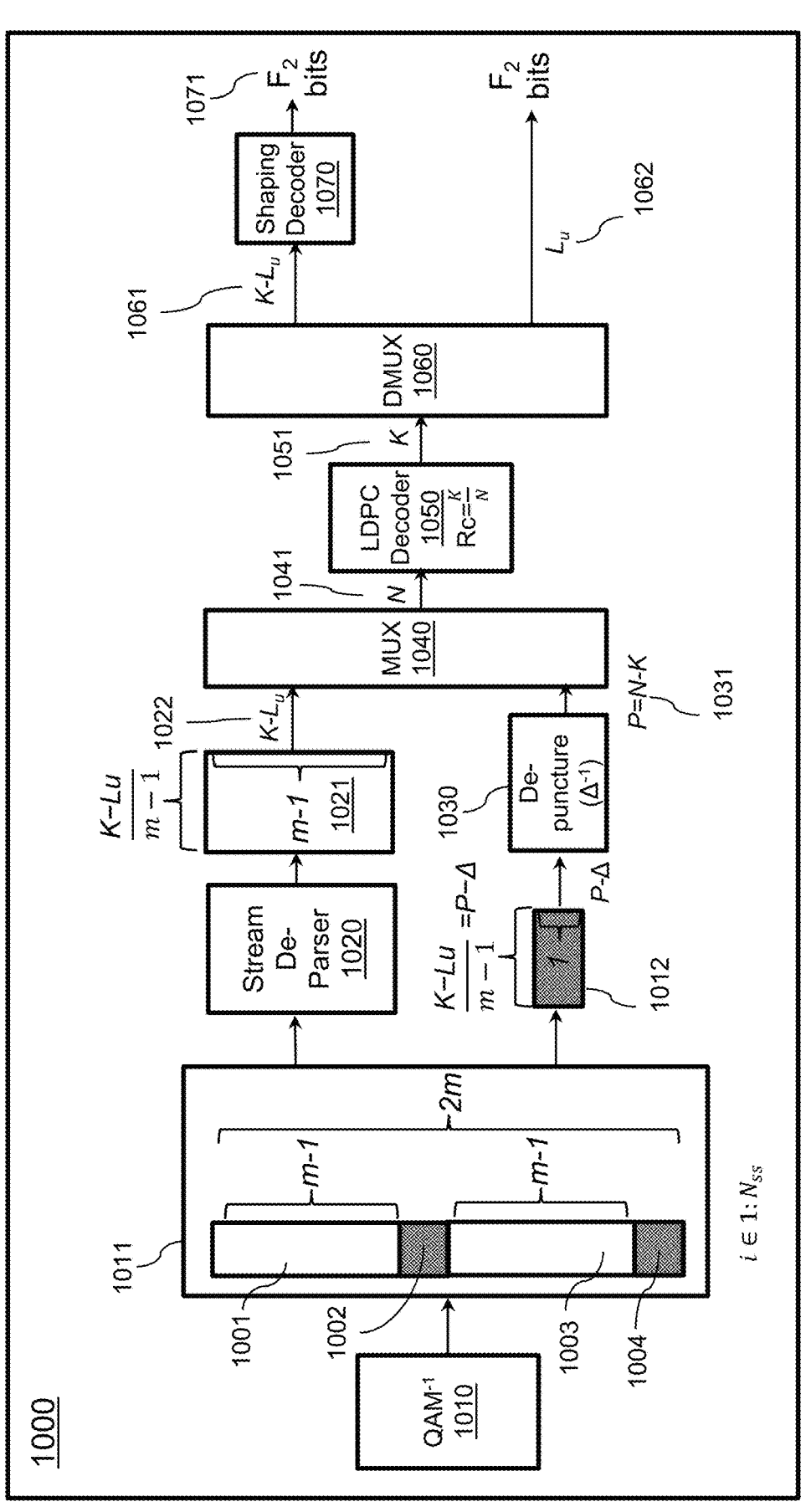
FIG. 10 is a diagram depicting an example LDPC-coded demodulation system including a shaping decoder, an LDPC decoder, and/or a symbol demapper, according to one or more embodiments.

FIG. 10 is a diagram depicting an example LDPC-coded demodulation system 1000, according to one or more embodiments. The LDPC-coded demodulation system 1000 may include a demodulator (e.g., M-QAM$^{-1}$) 1010, a stream deparser 1020, a parity depuncture 1030, a multiplexer (MUX) 1040, an LDPC decoder 1050, a demultiplexer (DMUX) 1060, a shaping decoder 1070. The demodulation system 1000 may be implemented in baseband circuitry (e.g., baseband circuitry 150) or receiver circuitry (e.g., receiver circuitry 140) of a communication system (e.g., communication system 108).

In some implementations, the demodulator (e.g., M-QAM$^{-1}$) 1010 may perform an inverse operation of that of the corresponding modulator (e.g., M-QAM 660) in the LDPC-coded modulation system 600. In some implementations, the stream deparser 1020 may perform an inverse operation of that of the corresponding stream parser 663 in the LDPC-coded modulation system 600. In some implementations, the parity depuncture 1030 may perform an inverse operation of that of the corresponding parity puncture 615 in the LDPC-coded modulation system 600. In some implementations, the LDPC decoder 1050 may perform an inverse operation of that of the corresponding LDPC encoder 613 in the LDPC-coded modulation system 600. In some implementations, the shaping decoder 1070 may perform an inverse operation of that of the corresponding shaping encoder 630 in the LDPC-coded modulation system 600.

Referring to FIG. 10, the demodulator (e.g., M-QAM$^{-1}$ where M=2 m) may output an array of LLR values 1011 with a size equal to 2 m. For example, the array of LLR values 1011 may include a first set of LLR values 1001, a second set of LLR values 1003, a first LLR value 1002, and a second LLR value 1004. In some implementations, assuming that the number of spatial streams ($N_{ss}$) is two ($N_{ss}$=2), the first set of LLR values 1001 of the array of LLR values 1011 corresponds to one antenna (e.g., a first MIMO antenna), while the second set of LLR values 1003 of the bit array 1011 corresponds to the other antenna (e.g., a second MIMO antenna). The stream deparser may receive a plurality of arrays of LLR values 1011 (e.g., a stream of the plurality of arrays 1011) and extract first sets of LLR values 1001 and second sets of LLR values 1003 to generate a matrix 1021 having (m−1) rows and $(K-L_u)/(m-1)$ columns. The demodulation system 1000 may generate, based on the matrix 1021, an array of $(K-L_u)$ LLR values 1022 (e.g., by serializing the matrix 1021). The demodulation system 1000 may extract, from the plurality of arrays of LLR values 1011, first LLR values 1002 and second LLR values 1004 to generate an array of LLR values 1012 with a size of $(K-L_u)/(m-1)$=P−Δ. The parity depuncture 1030 may add (or pad) Δ values to the array of (P−Δ) LLR values 1012 and generate a bit array of P (=N−K) LLR values 1031.

The MUX 1040 may receive the array of $(K-L_u)$ LLR values 1022 and the bit array of P LLR values 1031, and generate N LLR values (e.g., codewords) 1041. The LDPC decoder may receive the N LLR values 1041 and decode the N LLR values 1041 to generate K decoded bits 1051 according to the code rate $R_c$ of the LDPC code used in the corresponding LDPC encoder 613 of the LDPC-coded modulation system 600. The DMUX 1050 may receive the K decoded bits 1051 and generate $(K-L_u)$ bits 1061 and $L_u$ bits 1062. The shaping decoder 1060 may decode the $(K-L_u)$ bits 1061 using a shaping code (e.g., shaping code 700) to generate decoded data 1071 (corresponding to the original input data 621 in FIG. 6A).

FIG. 11 is a flow diagram showing a process 1100 for encoding data and/or decoding data using a shaping code and an LDPC code, in accordance with an embodiment. In some embodiments, the process 1100 is performed by one or more processors of a first device (e.g. encoder 130 or processor 2010 of communication system 105, processor 2010 of communication system 108, modulation system 600). In other embodiments, the process 1100 is performed by other entities (e.g., a computing system other than the communication system 105 or 108). In some embodiments, the process 1100 includes more, fewer, or different steps than shown in FIG. 11.

At step 1102, one or more processors may identify a code rate of a low-density parity-check (LDPC) code (e.g., $R_c$=7/8). At step 1104, the one or more processors may receive, by an LDPC encoder (e.g., LDPC encoder 613), a set of information bits (e.g., K information bits 622). In some implementations, the set of information bits may include a first set of bits (e.g., shaped information bits 642) and a second set of bits (e.g., unshaped information bits 611). A shaping encoder (e.g., shaping encoder 630) may identify a shaping code (e.g., shaping code 700). The shaping encoder may encode data using the shaping code, to generate the first set of information bits (e.g., shaped information bits 642). The LDPC encoder may receive, from an output of the shaping encoder, the first set of information bits.

At step 1106, the one or more processors may encode, by the LDPC encoder using the code rate (e.g., $R_c$=7/8), the set of information bits (e.g., K information bits 622) to generate a set of encoded bits (e.g., $(K-L_u)$ encoded bits 651) and a set of parity bits (e.g., P number of parity bits 624).

At step 1108, the one or more processors may generate, from the set of encoded bits (e.g., $(K-L_u)$ encoded bits 651), a matrix of bit arrays (e.g., matrix 661). At step 1110, the one or more processors may discard one or more parity bits (e.g., Δ number of parity bits) from the set of parity bits (e.g., P number of parity bits 624) to generate a parity bit array (e.g., parity bit array 662) with a size equal to a number of column of the matrix (e.g., $(K-L_u)/(m-1)$).

At step 1112, the one or more processors may generate a bit array (e.g., bit array 670) by concatenating (1) one or more bit arrays (e.g., first column 671 and second column 673) selected from the matrix of bit arrays (e.g., matrix 661) and (2) one or more bits (e.g., first bit 672 and second bit 674) selected from the parity bit array (e.g., parity bit array 662) corresponding to the one or more bit arrays.

In some implementations, in generating the bit array, a first column (e.g., first column 671) and a second column (e.g., second column 672) may be selected from the matrix of bit arrays (e.g., matrix 661). A first bit (e.g., first bit 673) and a second bit (e.g., second bit 674) corresponding to the first column and the second column of the matrix of bit arrays, respectively, may be selected from the parity bit array (e.g., parity bit array 662). The first column, the second column, the first bit, and the second bit may be concatenated to generate the bit array. The generated bit array may include the first column, the first bit, the second column, and the second bit in this order. For example, as shown in FIG. 6C, the bit array 670 includes the first column 671, the first bit 672, the second column 673 and the second bit 674 in this order. The first column and the second column may be randomly selected (e.g., by the stream parser 663) from columns of the matrix of bit arrays. The first column and the second column may be sequentially selected from columns of the matrix of bit arrays in an order of the columns of the matrix of bit arrays.

At step 1114, the one or more processors may modulate, by a modulator (e.g., M-QAM 616), the bit array (e.g., bit array 670) to generate modulated data for transmission by a transmitter (e.g., transmitter circuitry 120). In some implementations, the transmitter may transmit the modulated data.

In some implementations, in modulating the bit array, the modulator (e.g., M-QAM 616) may perform a quadrature amplitude modulation with a number of bits per symbol (e.g., 2 m) on the bit array (e.g., bit array 670) to generate the modulated data. In generating the matrix of bit arrays (e.g. matrix 661), the number of columns of the matrix of bit arrays (e.g., $(K-L_u)/(m-1)$) columns of the matrix 661) may be determined based at least on the number of bits per symbol (e.g., 2 m) and a size of the set of encoded bits (e.g., $(K-L_u)$). A number of rows of the matrix of bit arrays (e.g., m−1) may be determined based at least on the number of bits per symbol (e.g., 2 m). The bit array (e.g., bit array 670) may have a size (e.g., 2 m) equal to the number of bits per symbol.

Figure 12B:
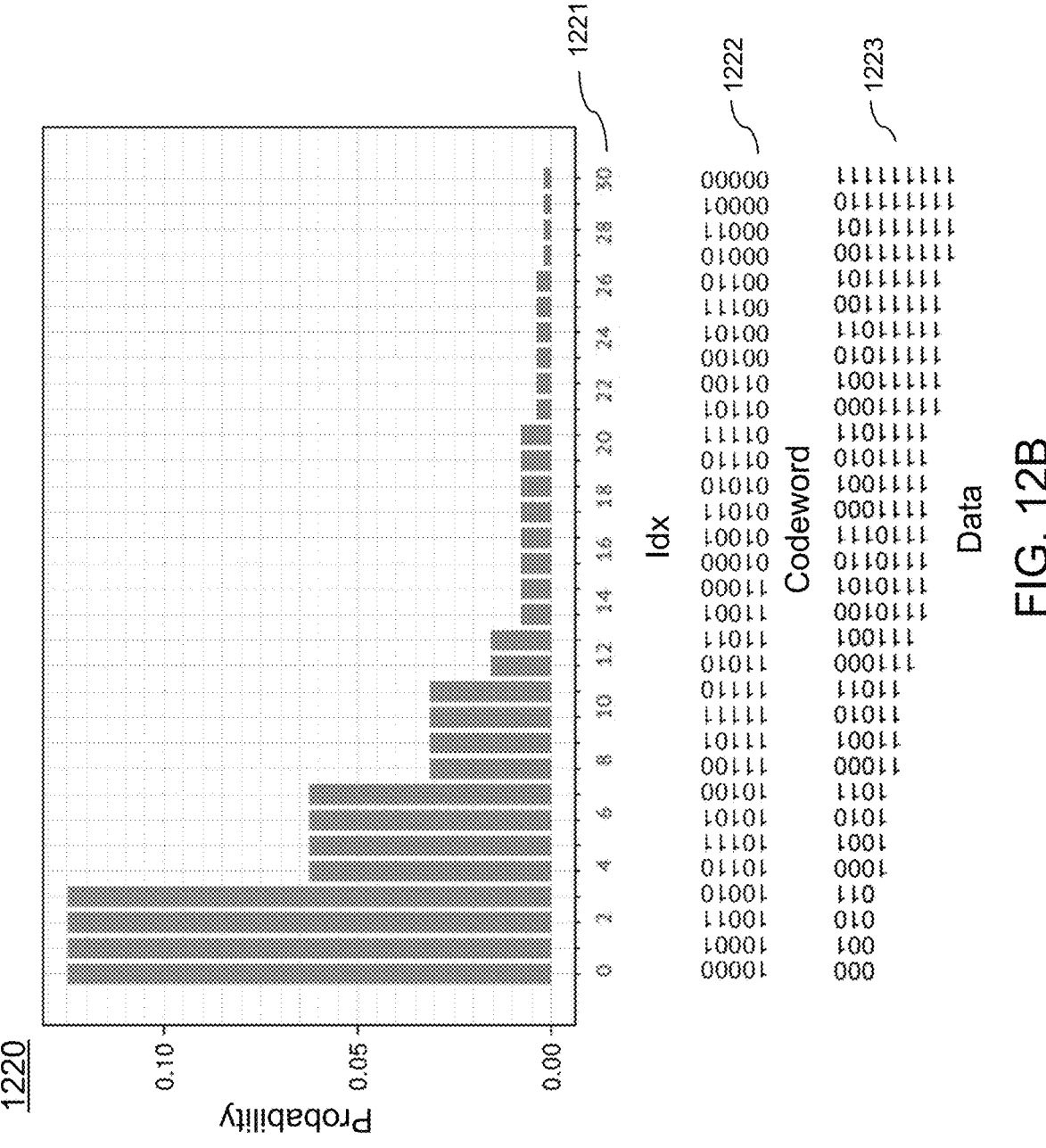

FIG. 12A and FIG. 12B are diagrams 1200, 1220 depicting an example shaping code (which can be included in a shaping codebook), according to one or more embodiments. FIG. 12A shows a shaping code 1200 for 4096-QAM with LDPC code rate of 5/6 to achieve the shaping rate $(R_s)$ of 0.8346, and the same spectral efficiency as MCS11. The shaping code 1200 may include a plurality of mappings (e.g., 32 mappings indexed 1207 by 0-31) from input binary data 1202 with length 1204 to output binary data 1203, with different probabilities 1205. For example, using the shaping code 1200, the shaping encoder 630 can shape/map/convert/ assign an input string of [1110100] into an output string of [11001] with the probability of 1/128 (see the mapping 14). FIG. 12B shows a histogram 1220 depicting a probability distribution over the mapping index 1221, codeword 1222, and input data 1223.

Figure 13B:
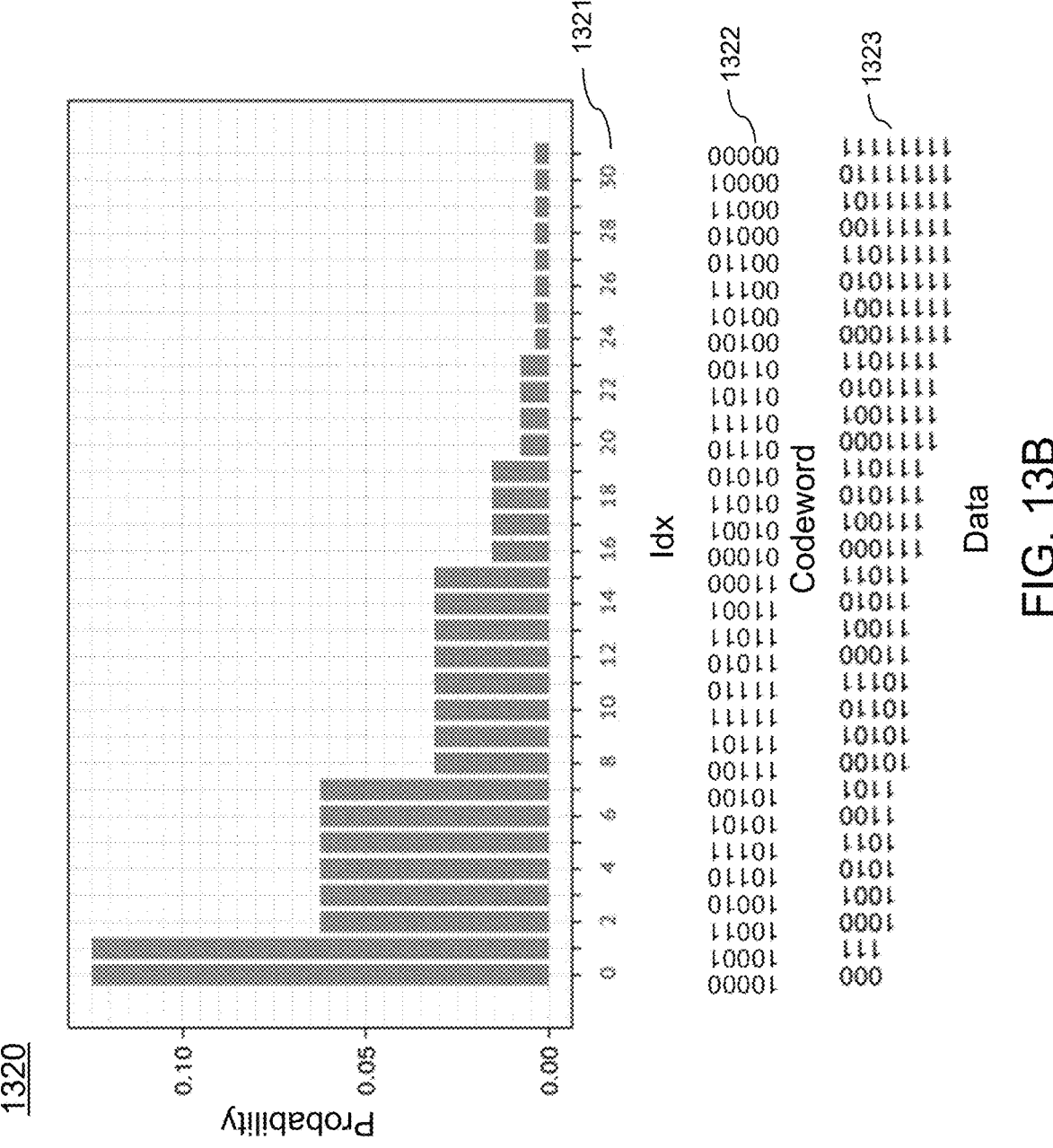

FIG. 13A and FIG. 13B are diagrams 1300, 1320 depicting an example shaping code (which can be included in a shaping codebook), according to one or more embodiments. FIG. 13A shows a shaping code 1300 for 4096-QAM with LDPC code rate of 3/4 to achieve the shaping rate $(R_s)$ of 0.891, and the same spectral efficiency as MCS12. The shaping code 1300 may include a plurality of mappings (e.g., 32 mappings indexed 1307 by 0-31) from input binary data 1302 with length 1304 to output binary data 1303, with different probabilities 1305. For example, using the shaping code 1300, the shaping encoder 630 can shape/map/convert/ assign an input string of [1111000] into an output string of [01110] with the probability of 1/128 (see the mapping 20). FIG. 13B shows a histogram 1320 depicting a probability distribution over the mapping index 1321, codeword 1322, and input data 1323.

Figure 14B:
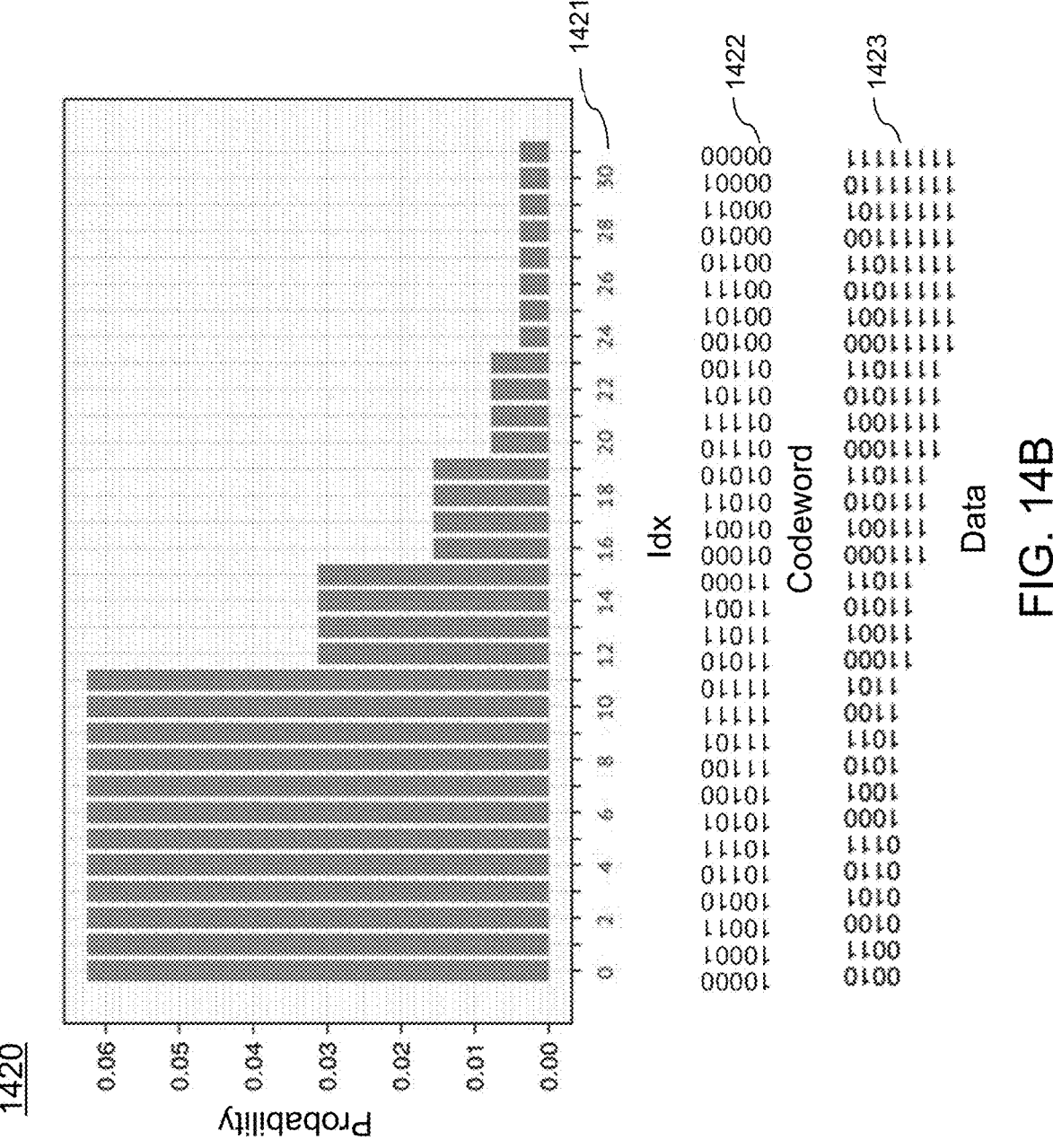

FIG. 14A and FIG. 14B are diagrams 1400, 1420 depicting an example shaping code (which can be included in a shaping codebook), according to one or more embodiments. FIG. 14A shows a shaping code 1400 for 4096-QAM with LDPC code rate of 3/4 to achieve the shaping rate $(R_s)$ of 0.91, and the same spectral efficiency as MCS12. The shaping code 1400 may include a plurality of mappings (e.g., 32 mappings indexed 1407 by 0-31) from input binary data 1402 with length 1404 to output binary data 1403, with different probabilities 1405. For example, using the shaping code 1400, the shaping encoder 630 can shape/map/convert/ assign an input string of [1111000] into an output string of [01110] with the probability of 1/128 (see the mapping 20). FIG. 14B shows a histogram 1420 depicting a probability distribution over the mapping index 1421, codeword 1422, and input data 1423.

Figure 15B:
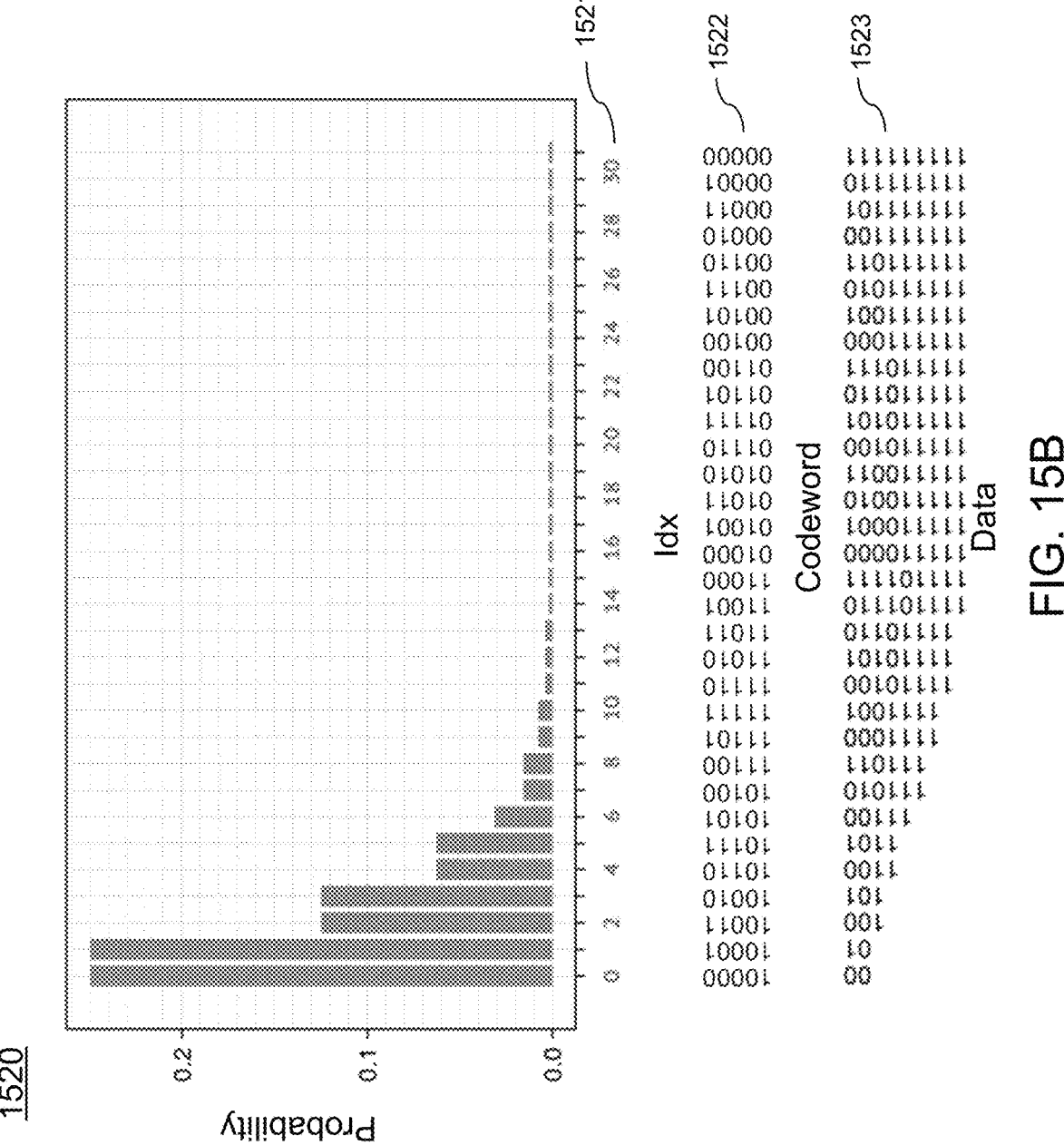

FIG. 15A and FIG. 15B are diagrams 1500, 1520 depicting an example shaping code (which can be included in a shaping codebook), according to one or more embodiments. FIG. 15A shows a shaping code 1500 for 4096-QAM with LDPC code rate of 5/6 to achieve the shaping rate $(R_s)$ of 0.686, and the same spectral efficiency as MCS9. The shaping code 1500 may include a plurality of mappings (e.g., 32 mappings indexed 1507 by 0-31) from input binary data 1502 with length 1504 to output binary data 1503, with different probabilities 1505. For example, using the shaping code 1500, the shaping encoder 630 can shape/map/convert/ assign an input string of [1111000] into an output string of [11101] with the probability of 1/128 (see the mapping 9). FIG. 15B shows a histogram 1520 depicting a probability distribution over the mapping index 1521, codeword 1522, and input data 1523.

Figure 16B:
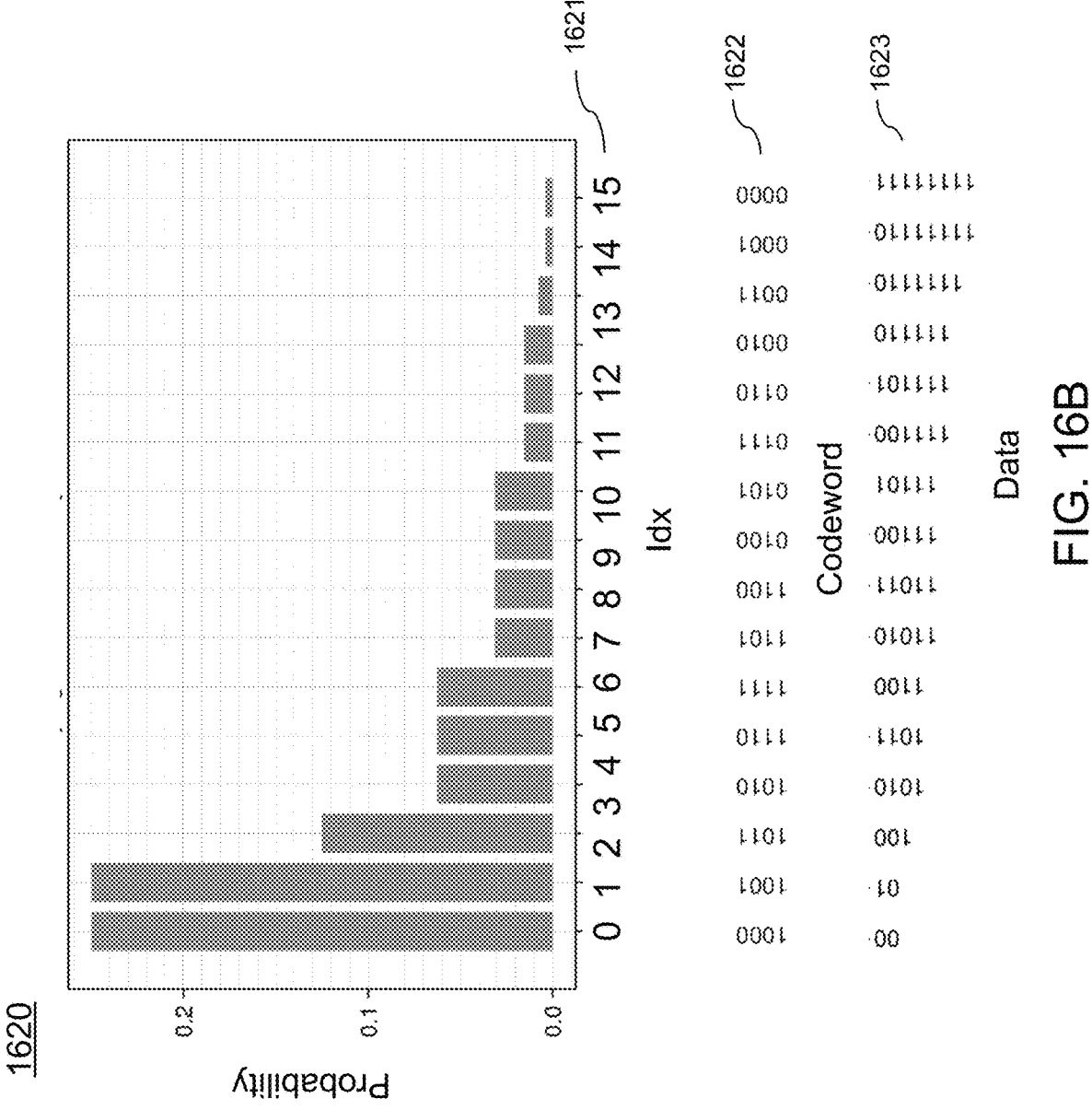

FIG. 16A and FIG. 16B are diagrams 1600, 1620 depicting an example shaping code (which can be included in a shaping codebook), according to one or more embodiments. FIG. 16A shows a shaping code 1600 for 1024-QAM with LDPC code rate of 5/6 to achieve the shaping rate $(R_s)$ of 0.83, and the same spectral efficiency as MCS9. The shaping code 1600 may include a plurality of mappings (e.g., 16 mappings indexed 1607 by 0-15) from input binary data 1602 with length 1604 to output binary data 1603, with different probabilities 1605. For example, using the shaping code 1600, the shaping encoder 630 can shape/map/convert/ assign an input string of [1111110] into an output string of [0011] with the probability of 1/128 (see the mapping 13). FIG. 16B shows a histogram 1620 depicting a probability distribution over the mapping index 1621, codeword 1622, and input data 1623.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., STAs, APs, beamformers and/or beamformees) that can operate within a system or environment. It should be understood that the systems described above can provide multiple ones of any or each of those components and these components can be provided on either a standalone machine or, in some embodiments, on multiple machines in a distributed system. Further still, bit field positions can be changed and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

I claim:

1. An apparatus comprising:
a transmitter and one or more processors, wherein
the one or more processors are configured to:
  identify a code rate of a low-density parity-check (LDPC) code;
  receive, by an LDPC encoder, a set of information bits;
  encode, by the LDPC encoder using the code rate, the set of information bits to generate a set of encoded bits and a set of parity bits;
  generate, from the set of encoded bits, a matrix of bit arrays;
  discard one or more parity bits from the set of parity bits to generate a parity bit array with a size equal to a number of column of the matrix;
  generate a bit array by concatenating (1) one or more bit arrays selected from the matrix of bit arrays and (2) one or more bits selected from the parity bit array corresponding to the one or more bit arrays; and
  modulate, by a modulator, the bit array to generate modulated data for transmission by the transmitter.

2. The apparatus of claim 1, wherein the transmitter is configured to transmit the modulated data.

3. The apparatus of claim 1, wherein
the set of information bits includes a first set of bits and a second set of bits;
the one or more processors are configured to:
  identify, by a shaping encoder, a shaping code;
  encode, by the shaping encoder using the shaping code, data to generate the first set of information bits; and
  receive, by the LDPC encoder from an output of the shaping encoder, the first set of information bits.

4. The apparatus of claim 1, wherein
in modulating the bit array, the one or more processors are configured to perform a quadrature amplitude modulation with a number of bits per symbol on the bit array to generate the modulated data; and
in generating the matrix of bit arrays, the one or more processors are configured to:
  determine, based at least on the number of bits per symbol and a size of the set of encoded bits, the number of columns of the matrix of bit arrays; and
  determine, based at least on the number of bits per symbol, a number of rows of the matrix of bit arrays.

5. The apparatus of claim 4, wherein the bit array has a size equal to the number of bits per symbol.

6. The apparatus of claim 1, wherein in generating the bit array, the one or more processors are configured to:
select a first column and a second column from the matrix of bit arrays; and
select, from the parity bit array, a first bit and a second bit corresponding to the first column and the second column of the matrix of bit arrays, respectively; and
concatenate the first column, the second column, the first bit, and the second bit to generate the bit array.

7. The apparatus of claim 6, wherein the generated bit array includes the first column, the first bit, the second column, and the second bit in this order.

8. The apparatus of claim 6, wherein the first column and the second column are randomly selected from columns of the matrix of bit arrays.

9. The apparatus of claim 6, wherein the first column and the second column are sequentially selected from columns of the matrix of bit arrays in an order of the columns of the matrix of bit arrays.

10. A method comprising:
identifying, by one or more processors, a code rate of a low-density parity-check (LDPC) code;
receiving, by an LDPC encoder, a set of information bits;
encoding, by the LDPC encoder using the code rate, the set of information bits to generate a set of encoded bits and a set of parity bits;
generating, from the set of encoded bits, a matrix of bit arrays;
discarding, by the one or more processors, one or more parity bits from the set of parity bits to generate a parity bit array with a size equal to a number of column of the matrix;
generating, by the one or more processors, a bit array by concatenating (1) one or more bit arrays selected from the matrix of bit arrays and (2) one or more bits selected from the parity bit array corresponding to the one or more bit arrays; and
modulating, by a modulator, the bit array to generate modulated data for transmission by the transmitter.

11. The method of claim 10, further comprising:
transmitting, by a transmitter, the modulated data.

12. The method of claim 10, wherein
the set of information bits includes a first set of bits and a second set of bits;
the method comprises:
  identifying, by a shaping encoder, a shaping code;
  encoding, by the shaping encoder using the shaping code, data to generate the first set of information bits; and
  receiving, by the LDPC encoder from an output of the shaping encoder, the first set of information bits.

13. The method of claim 10, wherein modulating the bit array comprises performing, by the modulator, a quadrature amplitude modulation with a number of bits per symbol on the bit array to generate the modulated data;

generating the matrix of bit arrays comprises:

determining, based at least on the number of bits per symbol and a size of the set of encoded bits, the number of columns of the matrix of bit arrays; and determining, based at least on the number of bits per symbol, a number of rows of the matrix of bit arrays.

14. The method of claim 13, wherein the bit array has a size equal to the number of bits per symbol.

15. The method of claim 10, wherein generating the bit array comprises:

selecting a first column and a second column from the matrix of bit arrays; and selecting, from the parity bit array, a first bit and a second bit corresponding to the first column and the second column of the matrix of bit arrays, respectively; and concatenating the first column, the second column, the first bit, and the second bit to generate the bit array.

16. The method of claim 15, wherein the generated bit array includes the first column, the first bit, the second column, and the second bit in this order.

17. The method of claim 15, wherein the first column and the second column are randomly selected from columns of the matrix of bit arrays.

18. The method of claim 15, wherein the first column and the second column are sequentially selected from columns of the matrix of bit arrays in an order of the columns of the matrix of bit arrays.

19. An apparatus comprising:

a transmitter; and one or more processors configured to:

identify a target code rate for which to encode data;

determine a code rate of a low-density parity-check (LDPC) code and a number of unshaped bits, to encode the data at the target code rate;

receive, by an LDPC encoder, the data including shaped bits generated by a shaping encoder and a set of unshaped bits with a size equal to the number, and encode, using the code rate, the data to generate a matrix of encoded bits and a set of parity bits;

discard, based at least on the number, one or more parity bits from the set of parity bits to generate a parity bit array;

generate a bit array by concatenating (1) one or more bit arrays obtained from columns of the matrix and (2) one or more bits obtained from the parity bit array corresponding to the one or more bit arrays; and modulate, by the modulator, the bit array to generate modulated data for transmission by a transmitter.

20. The apparatus of claim 19, wherein in determining the code rate, the one or more processors are configured to:

identify one or more code rates to encode the data at the target rate;

determine, for each of the one or more code rates, a number of parity bits discarded before the modulation; and select, from among the one or more code rates, a code rate corresponding to a least number parity bits discarded before the modulation.

\* \* \* \* \*